Feb. 5, 1963 T. H. KRUEGER 3,076,587

BOX SIZE CONTROLLED TAPE DISPENSER

Filed Jan. 29, 1958 15 Sheets-Sheet 1

INVENTOR.
Theodore H. Krueger.

BY *Moses, Nolte & Nolte.*
ATTORNEYS.

INVENTOR.
THEODORE H. KRUEGER.
BY Moses, Nolte & Nolte.
ATTORNEYS

INVENTOR.
Theodore H. Krueger.
BY Moses, Nolte & Nolte.
ATTORNEYS.

INVENTOR.
Theodore H. Krueger.
BY Moses, Nolte & Nolte.
ATTORNEYS

Feb. 5, 1963 T. H. KRUEGER 3,076,587

BOX SIZE CONTROLLED TAPE DISPENSER

Filed Jan. 29, 1958 15 Sheets-Sheet 5

INVENTOR.
Theodore H. Krueger.

BY Moses, Nolte & Nolte.
ATTORNEYS

Feb. 5, 1963 T. H. KRUEGER 3,076,587

BOX SIZE CONTROLLED TAPE DISPENSER

Filed Jan. 29, 1958 15 Sheets-Sheet 6

INVENTOR.
Theodore H. Krueger.
BY Moses, Nolte & Nolte.
ATTORNEYS.

Feb. 5, 1963 T. H. KRUEGER 3,076,587

BOX SIZE CONTROLLED TAPE DISPENSER

Filed Jan. 29, 1958 15 Sheets-Sheet 7

INVENTOR.
Theodore H. Krueger.

BY Moses, Nolte & Nolte.
ATTORNEYS.

INVENTOR.
Theodore H. Krueger.
BY Moses, Nolte & Nolte.
ATTORNEYS.

Feb. 5, 1963 T. H. KRUEGER 3,076,587

BOX SIZE CONTROLLED TAPE DISPENSER

Filed Jan. 29, 1958 15 Sheets-Sheet 9

INVENTOR.
Theodore H. Krueger.

BY *Moses, Nolte & Nolte.*
ATTORNEYS.

INVENTOR.
Theodore H. Krueger
BY
Moses, Nolte & Nolte.
ATTORNEYS.

Feb. 5, 1963 T. H. KRUEGER 3,076,587

BOX SIZE CONTROLLED TAPE DISPENSER

Filed Jan. 29, 1958 15 Sheets-Sheet 11

INVENTOR.
Theodore H. Krueger.

BY Moses, Nolte & Nolte.
ATTORNEYS.

Feb. 5, 1963 T. H. KRUEGER 3,076,587

BOX SIZE CONTROLLED TAPE DISPENSER

Filed Jan. 29, 1958 15 Sheets-Sheet 12

INVENTOR.
Theodore H. Krueger.
BY
Moses, Nolte & Nolte.
ATTORNEYS.

Feb. 5, 1963 T. H. KRUEGER 3,076,587

BOX SIZE CONTROLLED TAPE DISPENSER

Filed Jan. 29, 1958 15 Sheets-Sheet 13

INVENTOR.

Theodore H. Krueger.

BY

Moses, Nolte & Nolte

ATTORNEYS.

Feb. 5, 1963 T. H. KRUEGER 3,076,587

BOX SIZE CONTROLLED TAPE DISPENSER

Filed Jan. 29, 1958 15 Sheets-Sheet 14

INVENTOR.
Theodore H. Krueger.
BY
Moses, Nolte & Nolte.
ATTORNEYS.

Feb. 5, 1963 T. H. KRUEGER 3,076,587

BOX SIZE CONTROLLED TAPE DISPENSER

Filed Jan. 29, 1958 15 Sheets-Sheet 15

INVENTOR.
Theodore H. Krueger.
BY
Moses, Nolte & Nolte.
ATTORNEYS.

3,076,587
BOX SIZE CONTROLLED TAPE DISPENSER
Theodore H. Krueger, Stratford, Conn.
(% Better Packages Inc., Shelton, Conn.)
Filed Jan. 29, 1958, Ser. No. 711,859
15 Claims. (Cl. 226—135)

*"Boxize" Controlled Tape Dispenser*

This invention relates to dispensers for sealing tape in which means are provided for dispensing pieces of tape of proper length for use in sealing a box, shipping case or other package in which the length of the pieces of tape dispensed is automatically controlled by the dimensions of the box.

In tape dispensers presently in use various means for providing measured lengths of tape are employed. Some of these are very accurate and very rapid, but all depend upon the determination by the operator of the proper length necessary for sealing the box or case. If boxes or packages of various sizes and shapes are to be handled at random, it is necessary for the operator to determine the length of tape needed for each particular box, and this requires time and introduces the possibility of errors in measurement or judgment as to the amount of tape needed. Such errors usually result in large wastage of tape. In accordance with the present invention, the box itself automatically determines the length of the pieces of sealing tape needed for its proper sealing, and automatically causes the dispensing of pieces of tape of the proper length.

The invention of the present case may take various forms, and may be utilized in connection with tape dispensing instrumentalities and control devices of different kinds. It may be utilized to dispense any kind of tape such as ordinary gum tape which is moistened as it is dispensed, pressure sensitive tape, etc. In general, the invention contemplates the use of a support or table upon which the box is placed, and which is provided with instrumentalities engaged by the box, and in effect measuring the dimensions of the box. These instrumentalities then control the tape feeding operation so as to feed out one or more pieces of tape of the proper length, which are then applied to the sealing of the box.

The present invention is especially useful in connection with power operated tape dispensing machines, but may also be used advantageously for the controlling of the delivery of proper lengths of tape in certain types of manually operated machines.

In the accompanying drawings, which illustrate certain preferred embodiments of the invention FIG. 1 is a perspective view showing one form of box measuring instrumentality comprising a frame with box contact switches on which a box is rested, mounted on a bench or table and alongside of which is located one preferred form of automatic tape dispenser;

Figure 15:
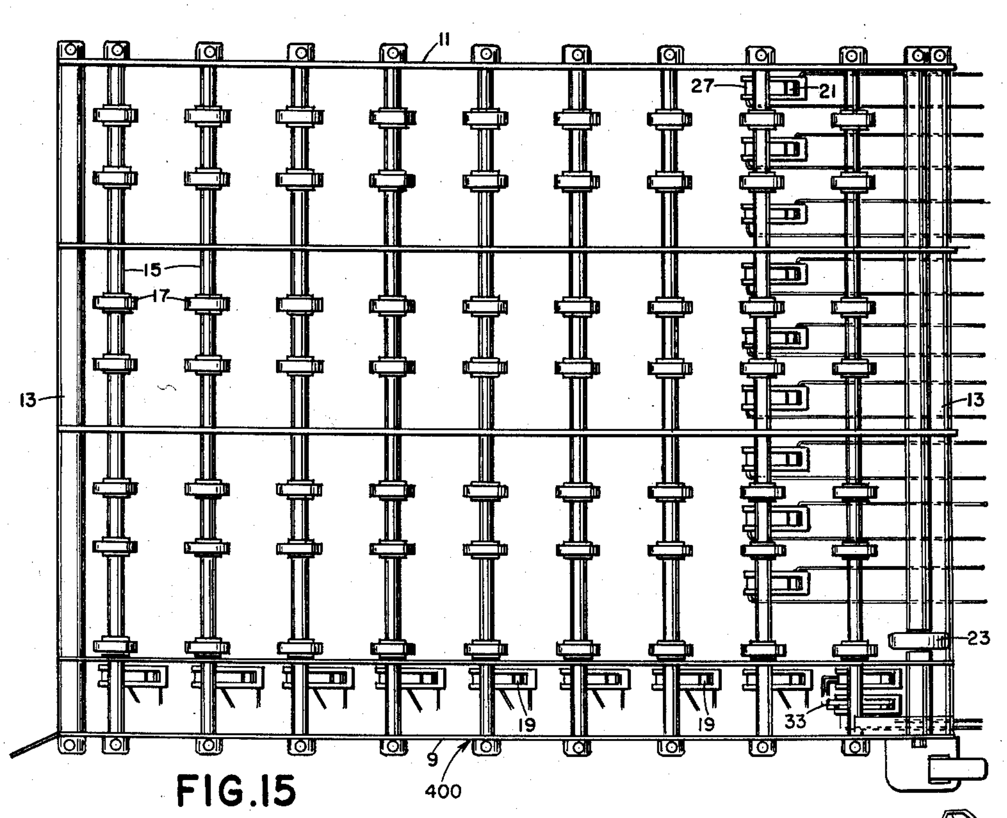
FIGS. 15 and 16 are a plan view and side elevation respectively, of a box measuring frame of a modified form, parts being broken away in FIG. 16.
Figure 16:
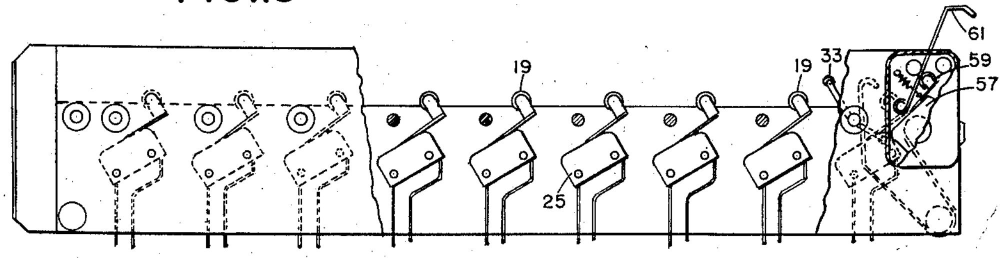
Figure 17:
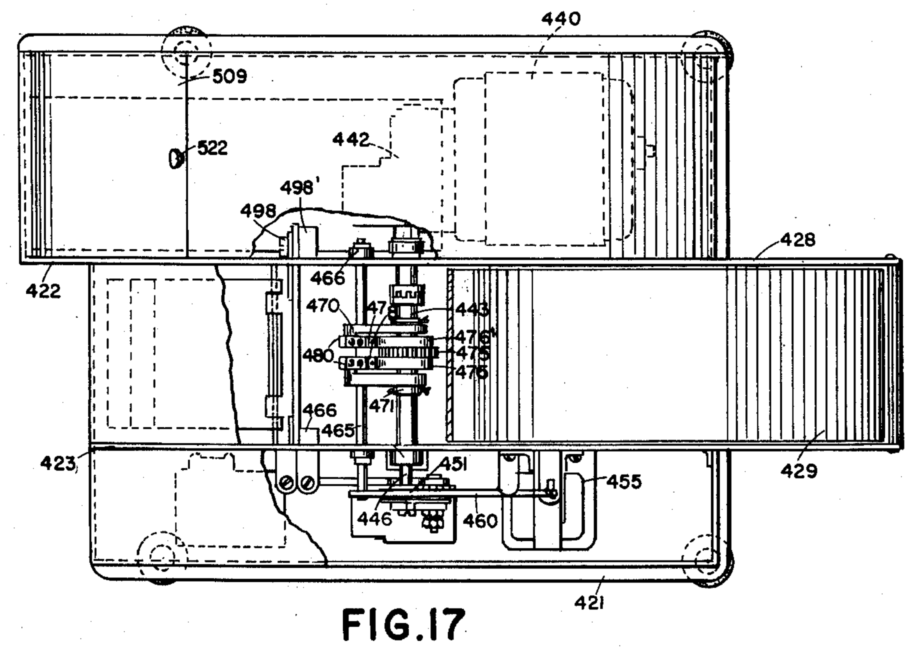
FIG. 17 is a plan view of a modified form of dispenser useable with the box measuring frame of the form shown in FIGS. 15 and 16.
Figure 18:
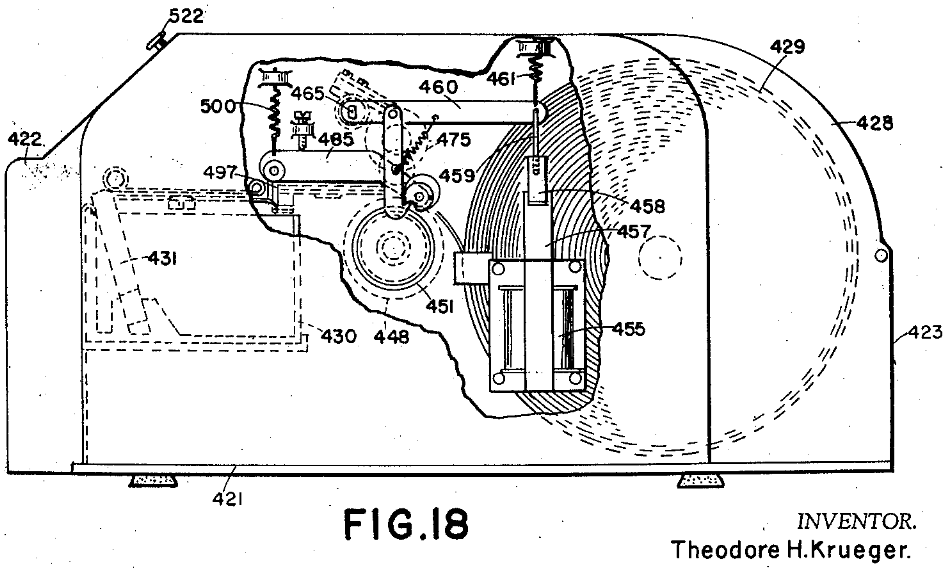
FIG. 18 is a side elevation of a machine shown in FIG. 17, part of the side wall being broken away to show the interior construction.
Figure 19:
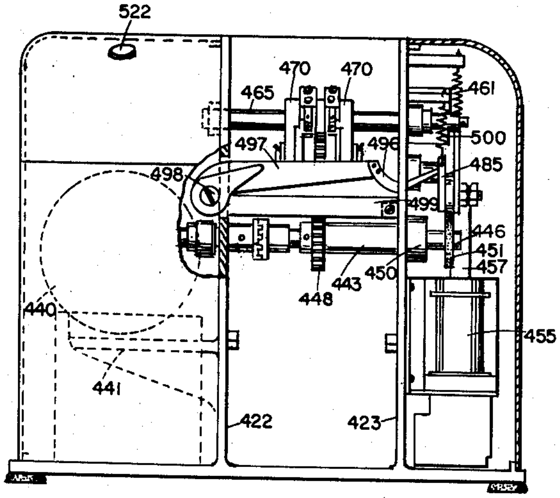
FIG. 19 is an end elevation of the machine shown in FIGS. 17 and 18.
Figure 20:
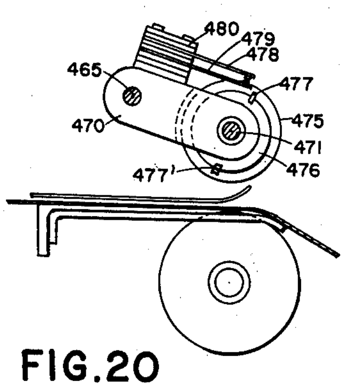
Figure 21:
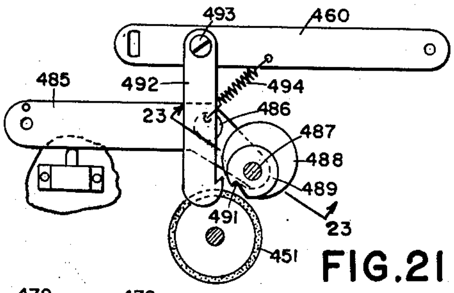
Figure 22:
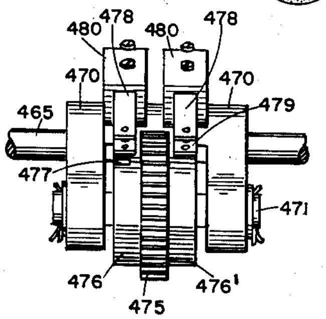
Figure 23:
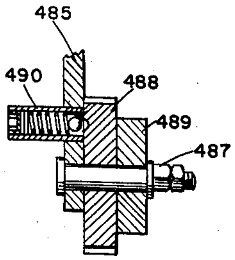
Figure 24:
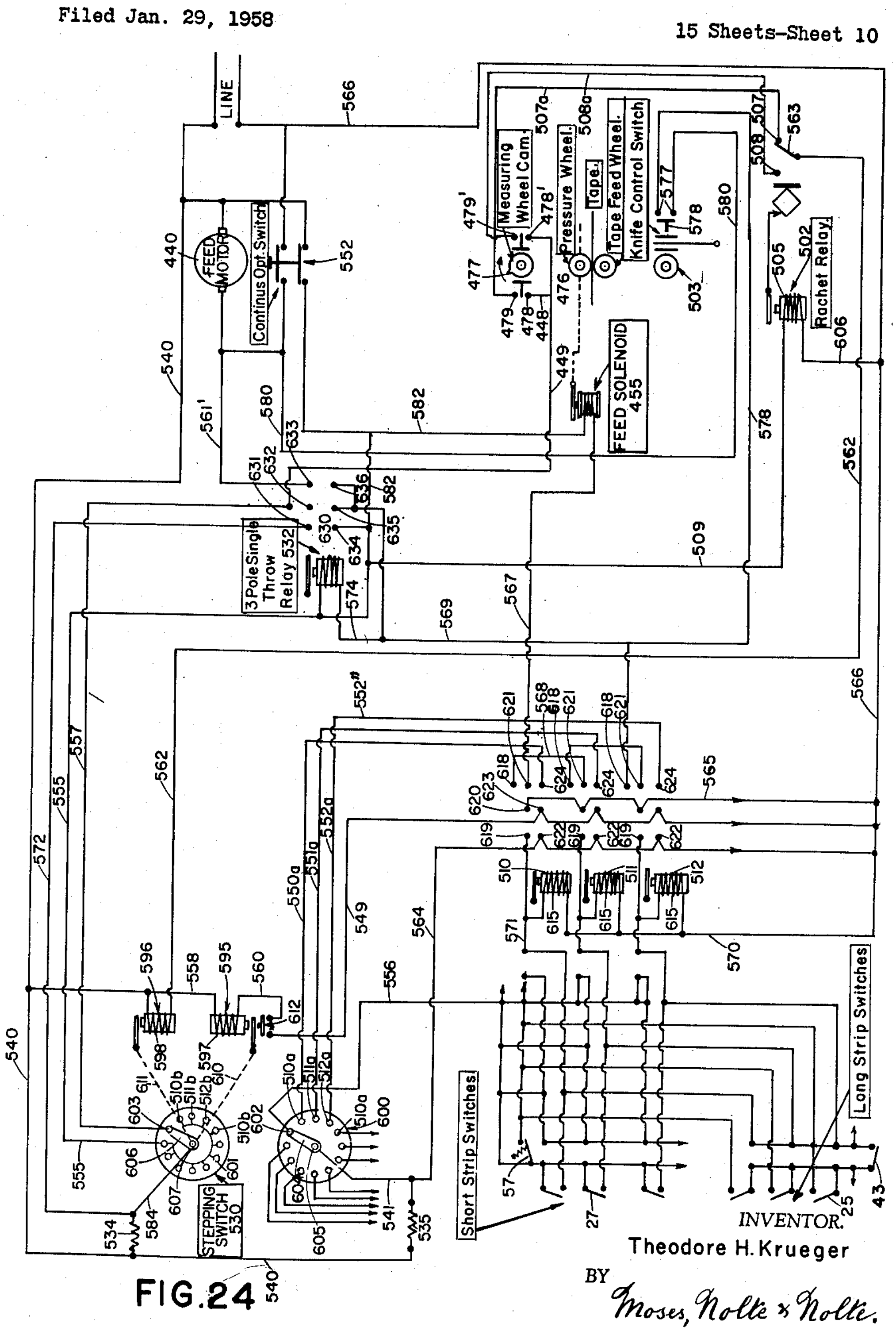
Figure 25:
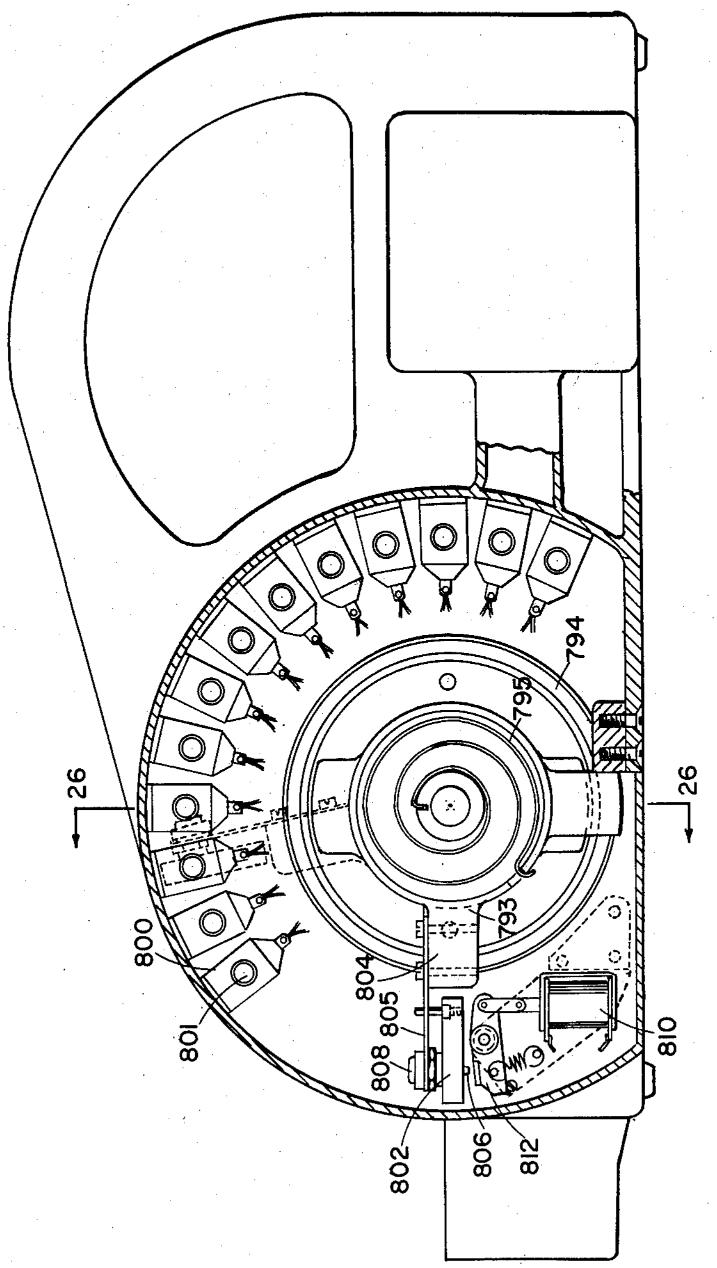
Figure 26:
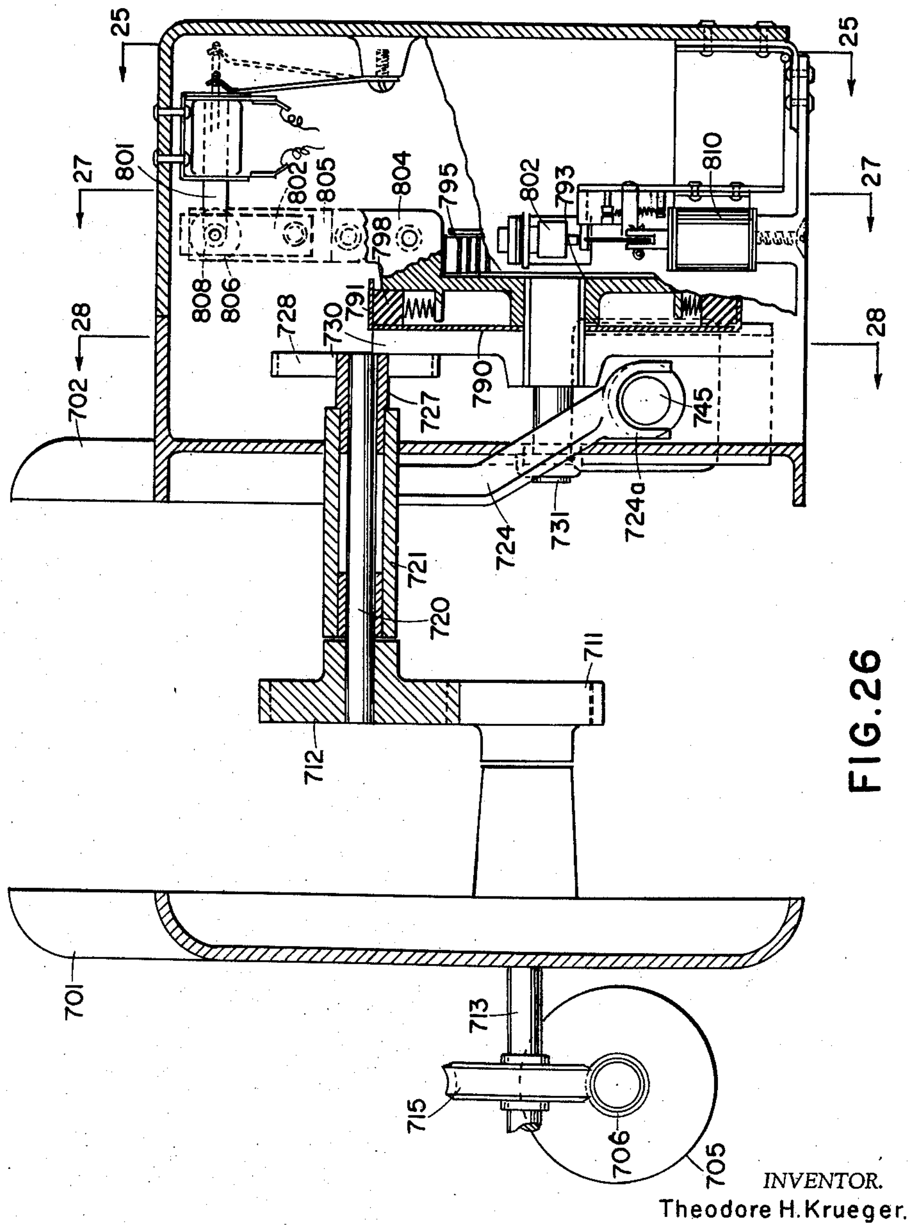
Figure 27:
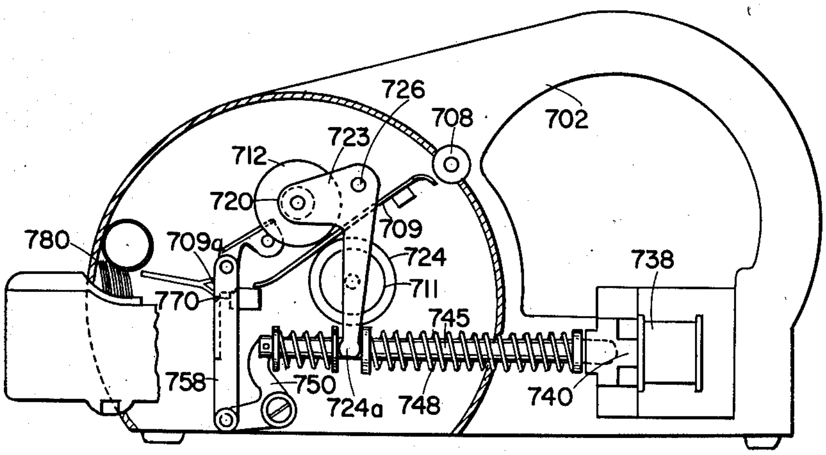
Figure 28:
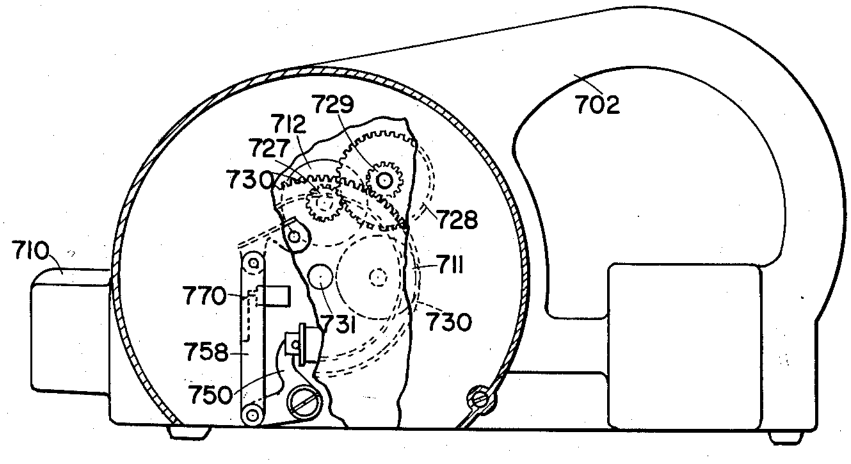
Figure 29:
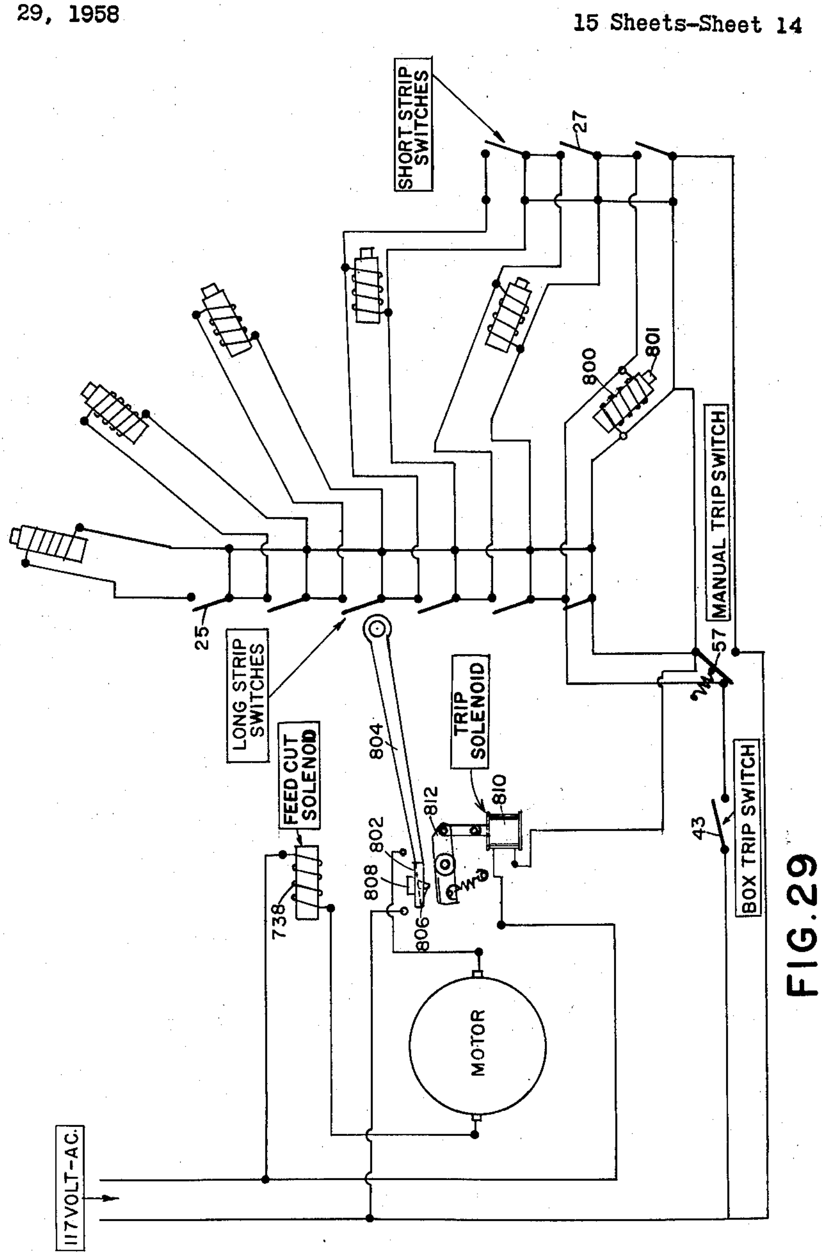
Figure 30:
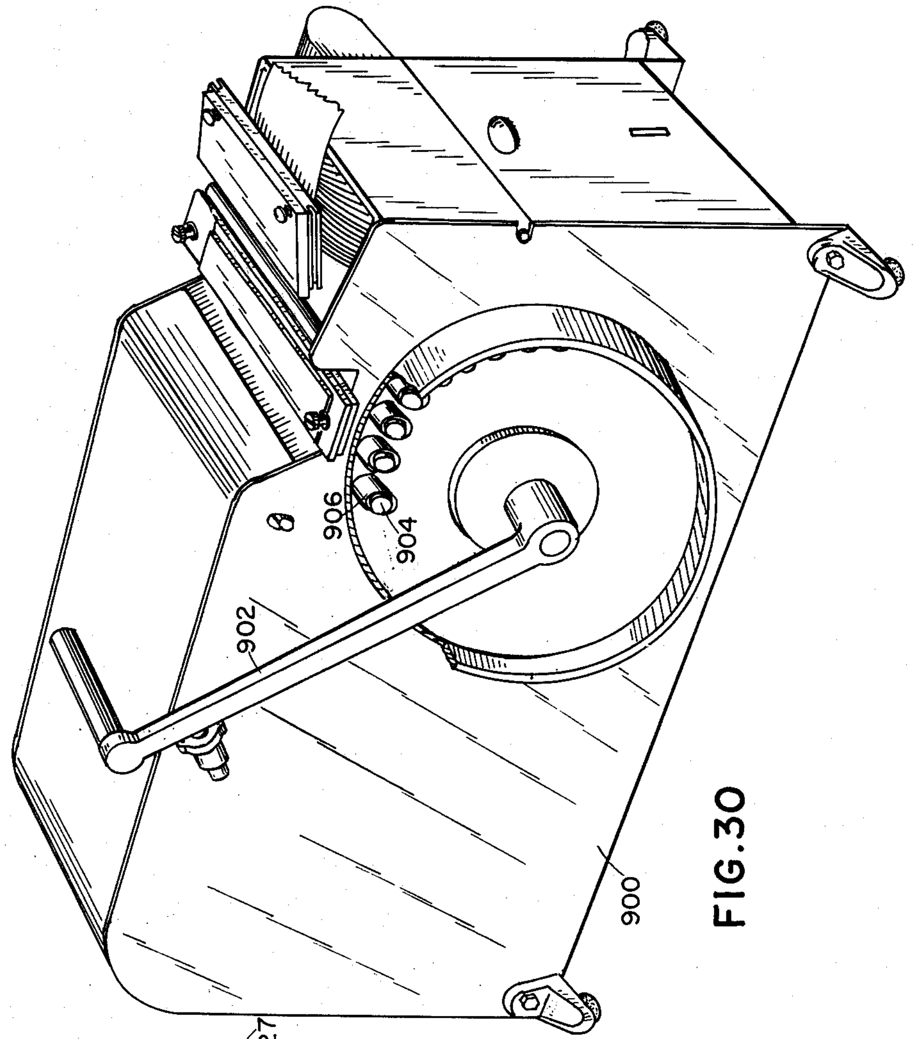
Figure 31:
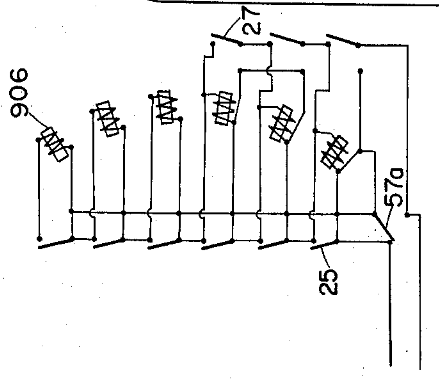

FIGS. 20 and 21 are fragmentary vertical sections of details taken on lines 20—20 and 21—21, respectively, of FIG. 19;

FIG. 22 is a front elevation of the parts shown in FIG. 20;

FIG. 23 is a section on line 23—23 of FIG. 21;

FIG. 24 is a schematic wiring diagram of the box measuring frame and dispenser of the type shown in FIGS. 15 to 23;

FIG. 25 is a side elevation of another form of tape dispenser which may be used in connection with a box measuring frame such as disclosed in FIGS. 15 and 16, the outer wall of the casing being broken away as indicated by line 25—25 of FIG. 26;

FIG. 26 is a vertical transverse section taken on line 26—26 of FIG. 25, parts being omitted;

FIG. 27 is a view partly in side elevation and partly in vertical section taken on line 27—27 of FIG. 26;

FIG. 28 is a section similar to FIG. 27 taken on line 28—28 of FIG. 26;

FIG. 29 is a schematic wiring diagram of the dispenser and box measuring system shown in FIGS. 25 to 28;

FIG. 30 is a perspective view of a lever operated dispenser having electrical box measuring means embodying one form of the present invention applied thereto; and FIG. 31 is a schematic wiring diagram of the box measuring instrumentality employed with a manual type of machine such as shown in FIG. 30.

The present invention in various of its aspects, is applicable to most types of dispensers, both power operated and manual dispensers. It is particularly useful in connection with the type of automatic tape dispenser set forth in patent to Beckman and Dodds, No. 2,408,363 and is in its preferred form illustrated in connection with an improved form of electronic dispenser disclosed in application of Le Baron and Dodds, Serial No. 497,884, filed March 30, 1955, now Patent No. 2,892,500.

Figures 1, 2, 3, 4:
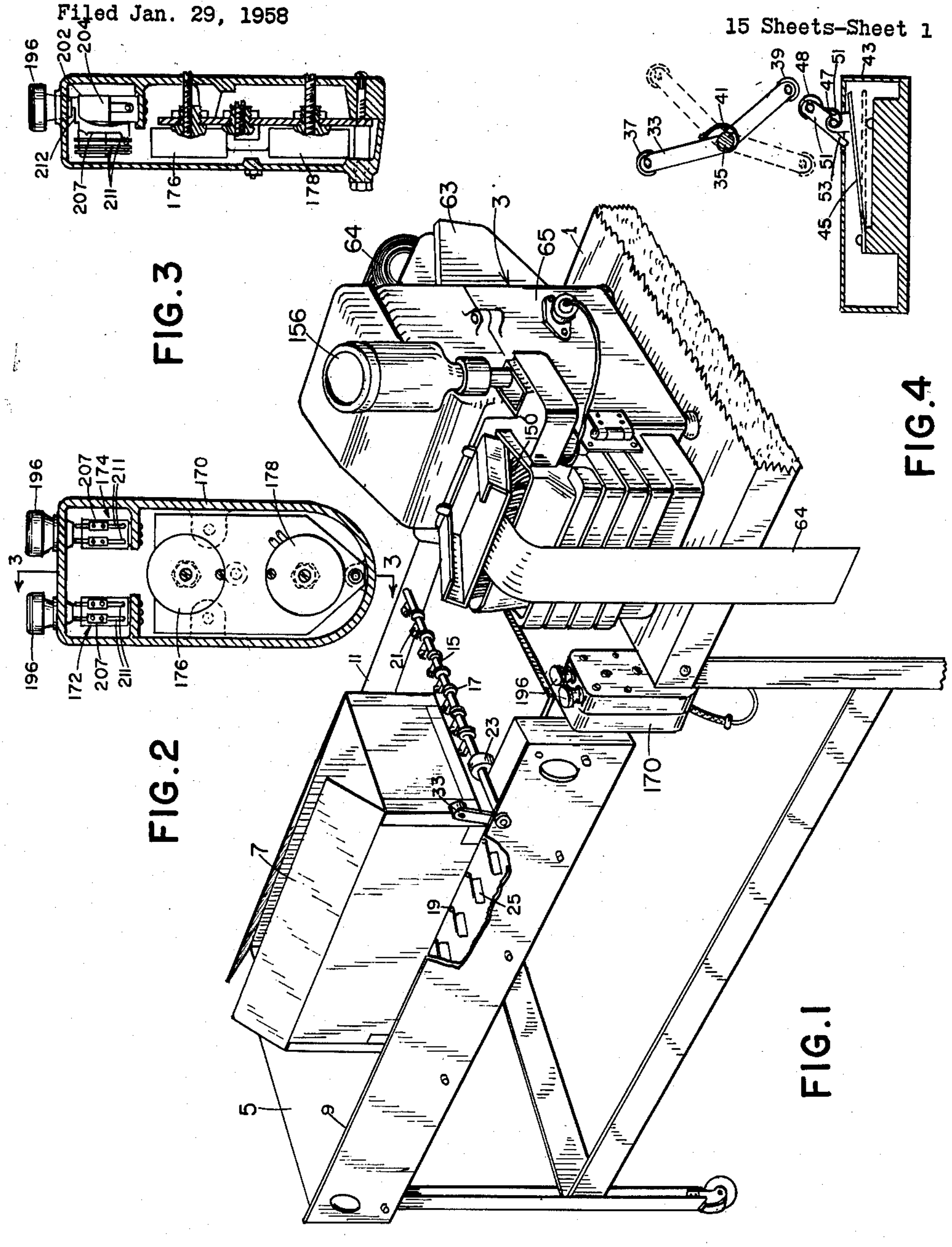
FIG. 2 is a detail view in vertical section of a key relay housing which may be used in connection with the dispenser shown in FIG. 1.
FIG. 3 is a vertical section on line 3—3 of FIG. 2.
FIG. 4 is a detail view in vertical section showing a trip switch for starting the dispensing of tape upon movement of the end of the box in contact with the switch operating lever.

One preferred embodiment of the invention is illustrated in FIGS. 1 to 14. As shown in FIG. 1, the apparatus is mounted on a shipping bench or table 1, upon which is placed the actual tape dispensing device 3. Another part of the table 5 has placed thereon or built therein a frame containing a plurality of contact members engaged by the box 7 which is placed thereon, and which may be termed the box measuring frame. One form of this frame is shown in FIGS. 7 to 10, and in slightly modified form in FIGS. 11 to 13.

Referring particularly to FIGS. 1 and 7 to 10, the frame shown comprises vertical side plates 9 and 11 connected by cross members 13. For convenience in handling the box, the frame preferably carries a plurality of shafts 15, on which are mounted idler rollers 17 on which the box is placed. The frame, shafts and rollers thus comprise a conveyor table. The front wall 9 of the frame is preferably higher than the upper surfaces of the rollers, so that the box may be guided along that wall as it is slid or rolled into position. A series of contact members 19 are mounted along the length of the frame, these members normally projecting slightly above the surfaces of the rollers 17 and being yieldingly mounted so as to be pressed down by the weight of the box placed thereon. A second series of contact members 21 is mounted transversely near the front end of the frame, these also being arranged to be pressed down by the weight of the box. The box is moved forwardly over the rollers 17 until it contacts a stop member 23 which limits the forward movement of the box. It will be seen that, when the box is placed on the frame with one side against the side wall 9 and with the front of the box against the stop 23, the number of contact members 19 pressed down by the box will depend upon the lengthwise dimension of the box, and the number of contact members 21 pressed down will depend upon the width of the box. Each of the contact members is associated with switch means electrically connected with the control devices of the tape dispenser in such a way as to control the length of tape fed by the number of contact members pressed down. Thus, the size of the box determines the length of tape fed.

Referring further to FIGS. 7 to 10 in the construction shown, the contact members 19 are in the form of rollers mounted on the operating levers 24 of normally closed microswitches 25. The contact members 21 are mounted on the levers of microswitches 27. The switches 25 are connected in series, and each is connected in shunt with a resistor 29 which is cut into the circuit when its contact member is depressed thereby opening the switch. Thus, the resistance of the circuit is varied in accordance with the length of the box. In the same way the microswitches 27 are also connected in a separate series, and each is connected with a resistor 31. If the contact members are equally spaced, as is usually the case, the resistors will have equal value. In order to assure this, the resistors are preferably of potentiometer type, so that slight corrections may be made if needed.

Figure 14:
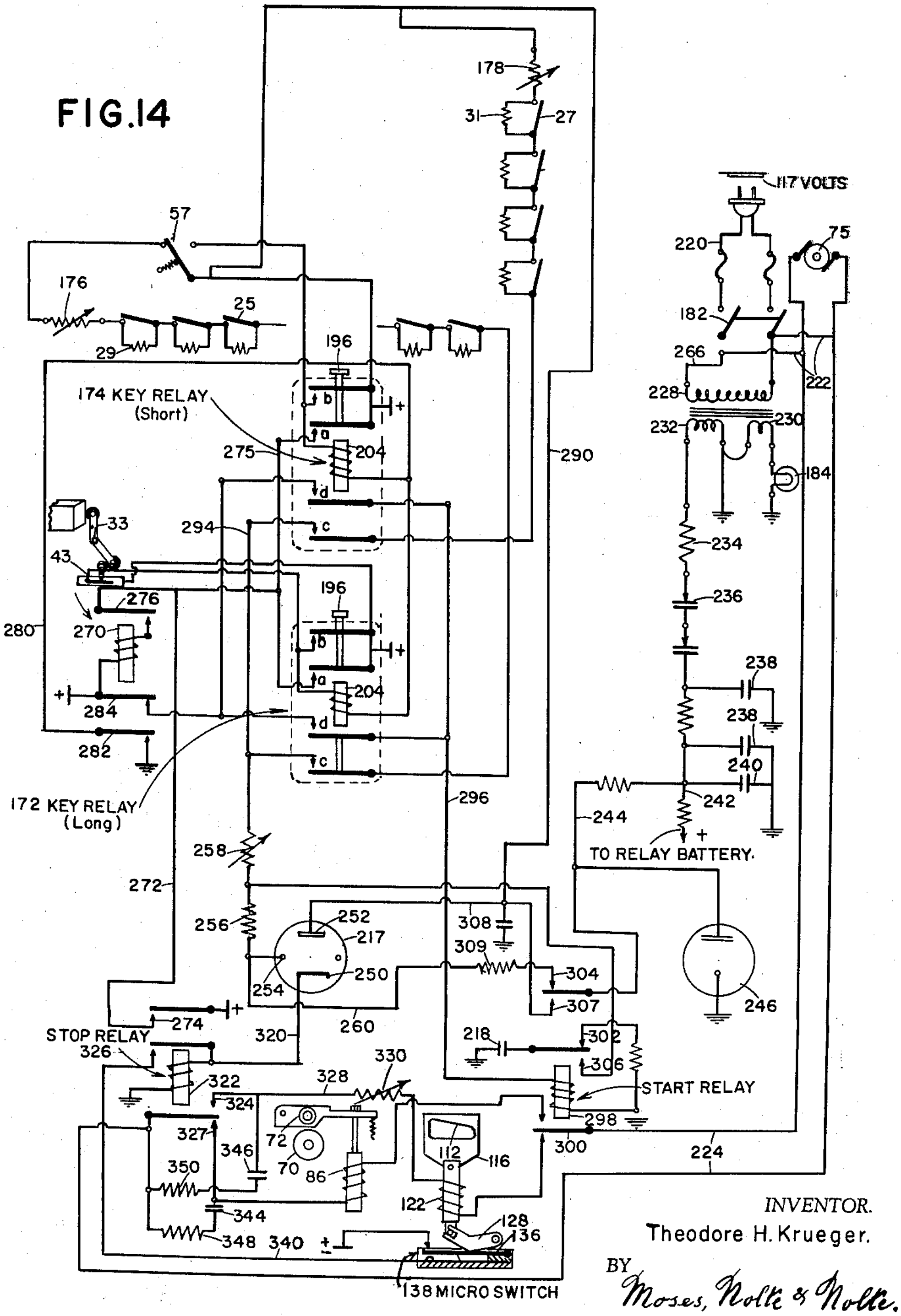
FIG. 14 is a schematic wiring diagram of the box measuring frame and dispenser of the form shown in FIG. 1.

FIG. 14 shows the complete wiring diagram of the apparatus illustrated in FIGS. 1 to 14, the microswitches 25, their resistors 29, and the microswitches 27, and their resistors 31 being shown in the upper left-hand part of the figure.

For starting the dispenser so as to cause it to deliver the first strip of tape for sealing the particular box, a switch is provided which will be engaged by the box when it is placed in position, so that the first strip is immediately dispensed by the machine, ready for application to the box. Ordinarily, the first strip to be applied to the box is the strip which is applied longitudinally to cover the box flaps. Usually, this is longer than the strips which may be used to cover the transverse corners of the box, and will accordingly be referred to as the "long" strip, the subsequent strips which are to be applied laterally to the box being referred to as the "short" strips. One long or longitudinal strip is always required; where the transverse or short strips are used, two of these will be required for each box. In the construction shown, there is a trip lever 33 located in front of the series of contact members 19 and adjacent to the stop member 23 which is engaged by the front of the box when it is pushed against such stop member. When the box is in this position, it has depressed a number of the contact members 19 depending upon the length of the box, and when the front of the box contacts the trip member, it will start the operation of feeding the first or long strip of tape.

The starting switch and trip member mechanism comprise the trip lever 33 which is pivoted on pivot 35, and which is shown as having contact rollers 37 and 39 at its ends. A coil spring 41 is preferably mounted about the pivot 35 for returning the trip lever to its initial position after the box is removed. The starting switch is shown as a normally open microswitch 43, which has an operating lever 45. Pivoted to ears on the end of the lever is a trip member 47 carrying a contact roller 48. 49 is the pivot point around which is a spring 51 which normally holds the member 47 in an angular position with respect to the lever 45. An ear 53 holds it in this position while the box engages the roller 37 and swings the lever 33 in a clockwise direction (FIG. 4). The roller 39 then contacts the roller 48 and forces the lever 45 down so as to momentarily close the switch 43. As soon as the box is moved away from contact with the roller 37, the spring 41 restores the lever 33 which passes the roller 48 and member 47, so that on the return swing of the lever 33 the switch is not closed. The lever is now ready to be contacted by the next box.

Figures 7, 8, 9, 10:
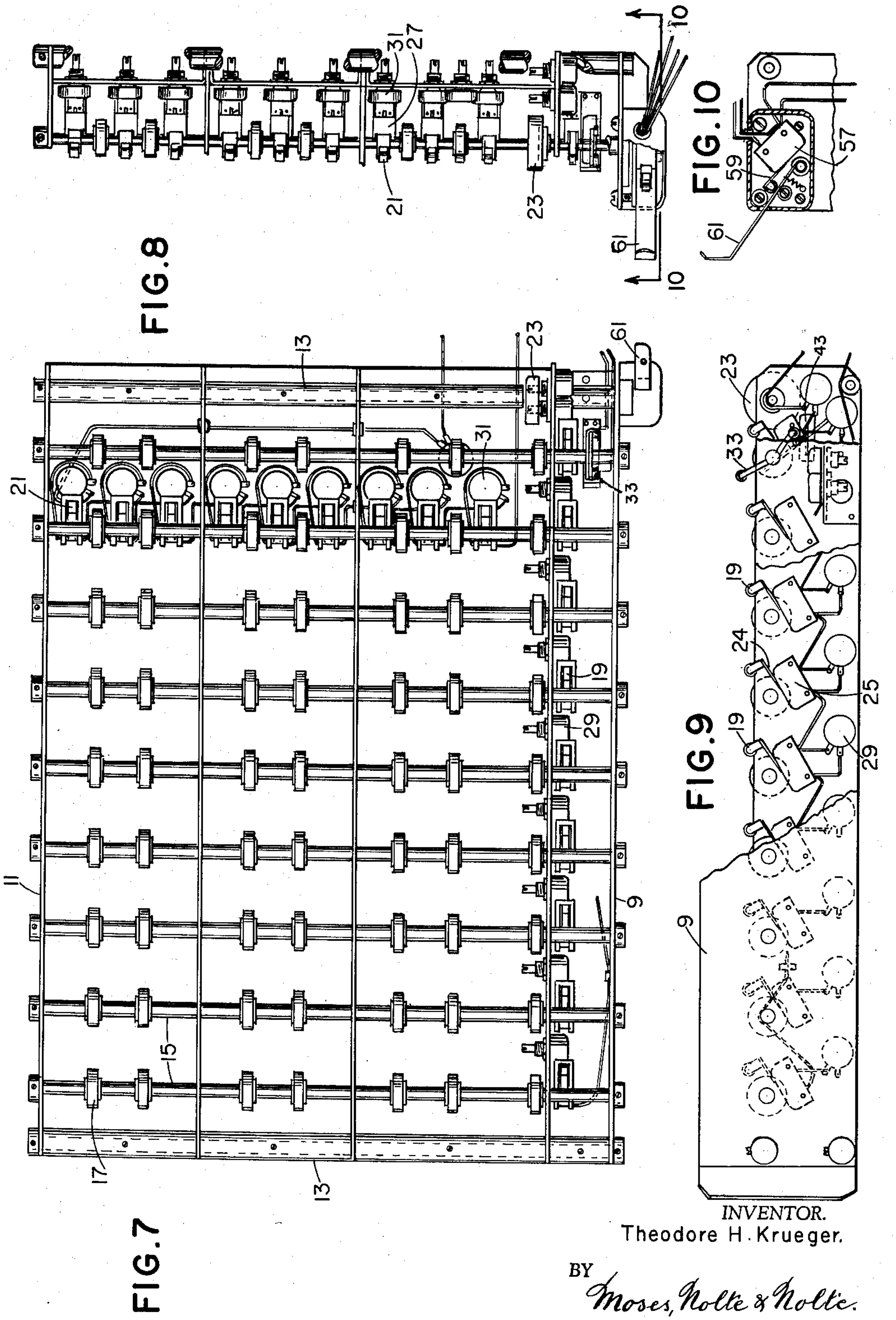
FIG. 7 is a plan view of the box measuring frame.
FIG. 8 is an end view of the same.
FIG. 9 is a side elevation of the frame shown in FIG. 7 with the front wall partly broken away.
FIG. 10 is a vertical section on line 10—10 of FIG. 8.

The length of the short pieces of tape which are to be placed transversely on the box are, as stated, determined by the number of contacts 21 depressed by the box when its side is placed against the wall 9 of the frame. A manual control switch is provided for causing the thus determined length of tape to be fed. This switch is shown in FIGS. 7, 8 and 10 as a double throw microswitch 57, the operating lever 59 of which is actuated by a finger trigger 61. One pole of this switch is in the circuit with the "long" length contact switches 25 and the other pole is in a circuit, the closing of which triggers feeding of a "short" length as determined by the number of switches 27 closed by contact with the box. When this trigger is depressed, the circuit through the switches 25 is broken rendering such switches inoperative while the first short length measured by the circuit through the switches 27 is caused to be delivered, and then for the second "short" length of tape the trigger will be depressed a second time.

When the box, sliding along guide plate 9, has rolled along rollers 17 until its leading end touches obstacle roller 23, it comes to rest. In that position of rest it is depressing a certain number of contact members 19 along its length and a certain number of contact members 21 along its width. It has, therefore, simultaneously conditioned the tape dispenser to feed either the long strip or the short strip. No actual feeding of either strip occurs until the appropriate trigger switch is closed. There are two such trigger switches.

In the particular construction illustrated, switch 43 is in circuit with the long strip key relay 172. (FIG. 14.) This switch is closed by lever 33 just before the box comes to a stop against roller 23, the box resting on lever 33 which through relay 172 starts the feed of the long strip.

Switch 57 which triggers the feeding of the already measured short strip, is not triggered by the box but by the hand of the operator. However, switch 57 being a double throw switch has a double purpose. When manually operated it not only triggers the feeding of the short strip through its connection with the second key relay 174, it also disconnects the measuring circuit for the long strip just before tripping the feed of the short strip.

Figures 11, 12, 13:
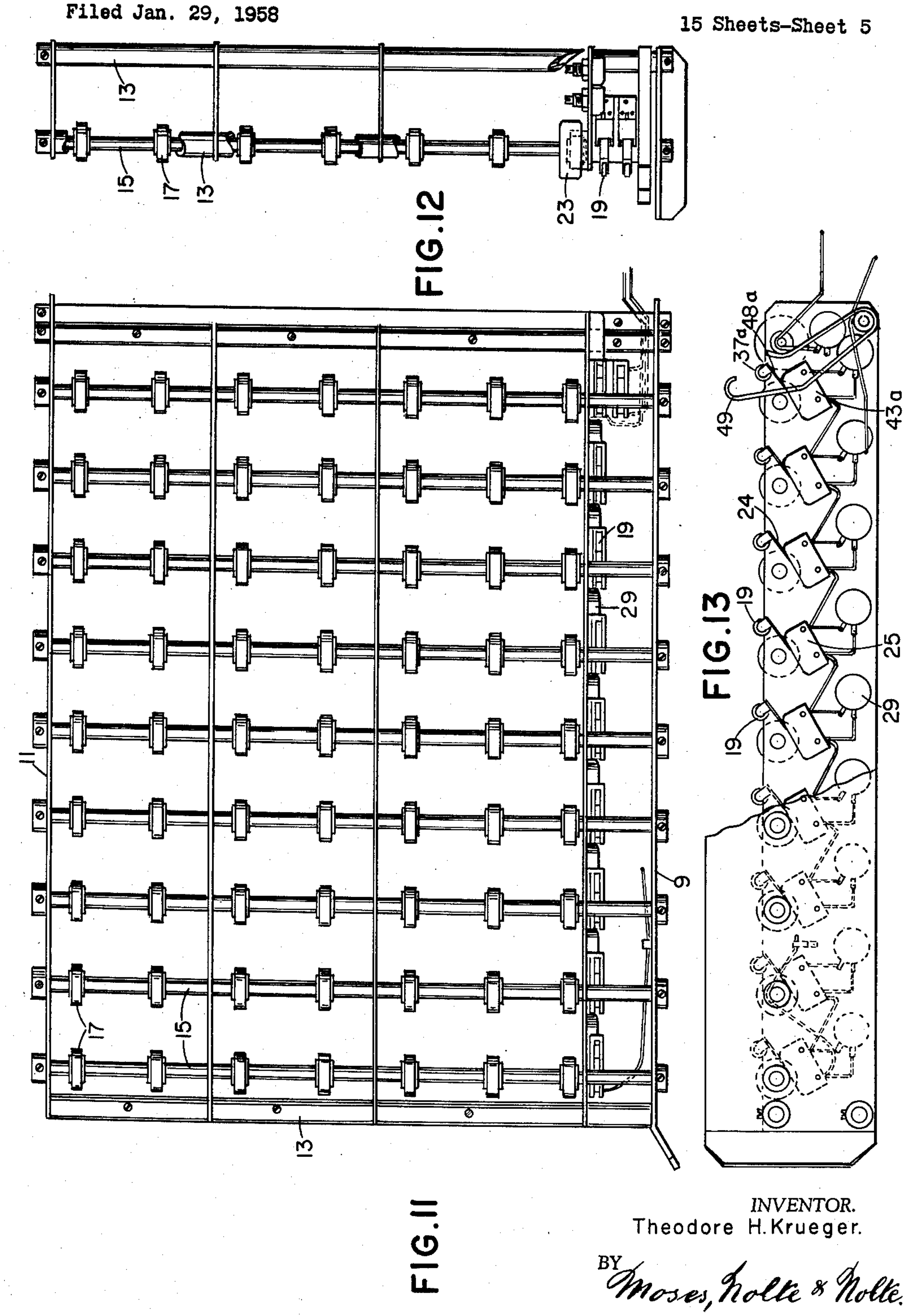
FIGS. 11, 12 and 13 are views similar to FIGS. 7, 8 and 9, respectively, showing a slightly modified construction of box measuring frame.

FIGS. 11, 12 and 13 show a slightly modified form of box supporting and measuring frame, in which only the length of the box is measured. Accordingly, the transverse series of switches 27 and their contact members 21 are omitted. This form of box supporting frame is particularly useful where only a single long strip of tape is used to seal the box. In this construction a modified form of starting switch is shown in place of that illustrated in FIGS. 4 and 7. The starting switch comprises a normally open micro-switch **43*a* on the operating lever 45*a* of which is a contact roller 19*a* pressed down by the box as it reaches the stop roller 23. A box return spring 46 is mounted adjacent the stop 23 which yields when the box is pushed against it so as to permit the box to momentarily close the switch 43*a* and then when the hand pressure is lessened it pushes the box back a little way so as to prevent accidental reclosing of the switch 43*a***.

Tape Feed

Figure 5:
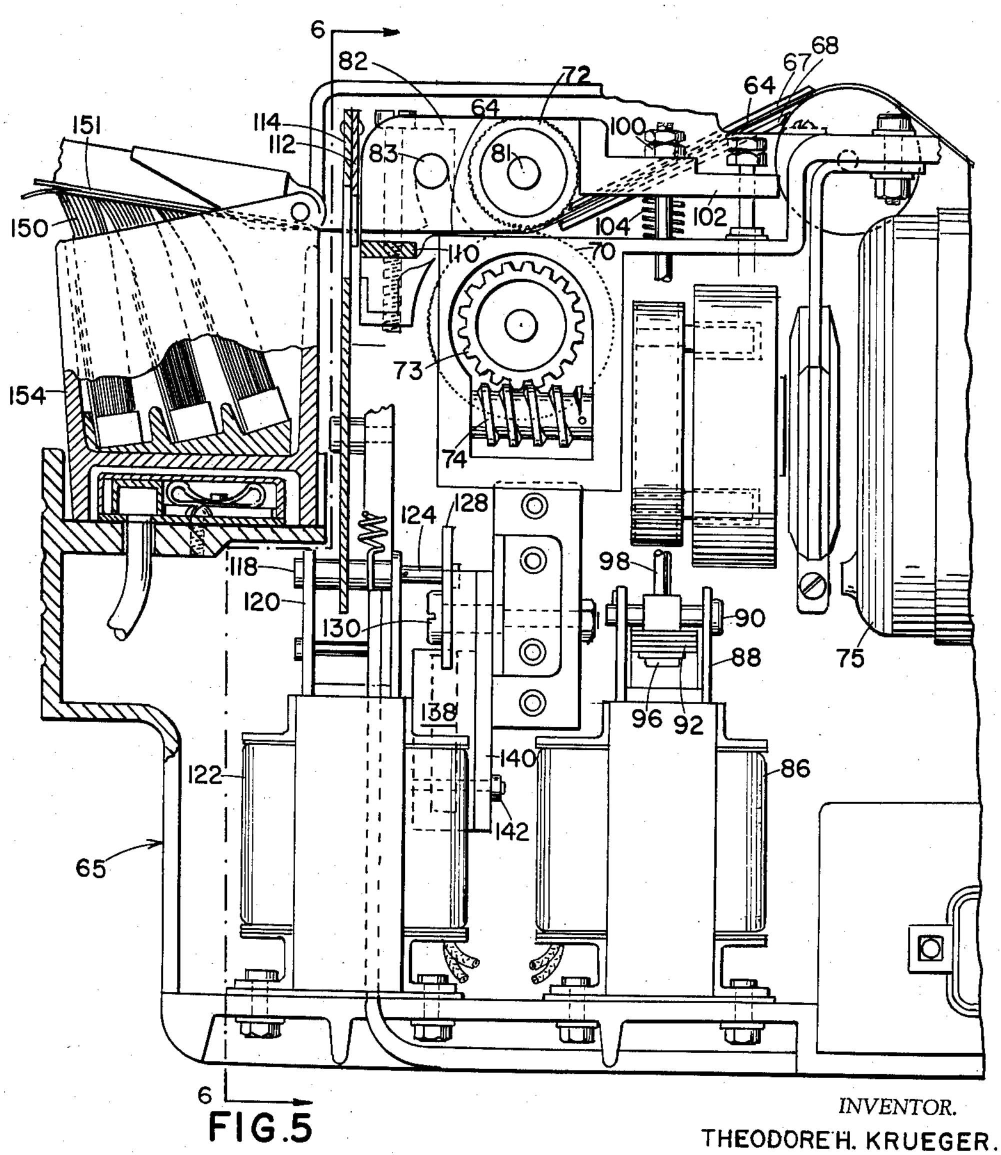
FIG. 5 is a side elevation of the dispenser shown in FIG. 1, with the side wall removed and parts being broken away.
Figure 6:
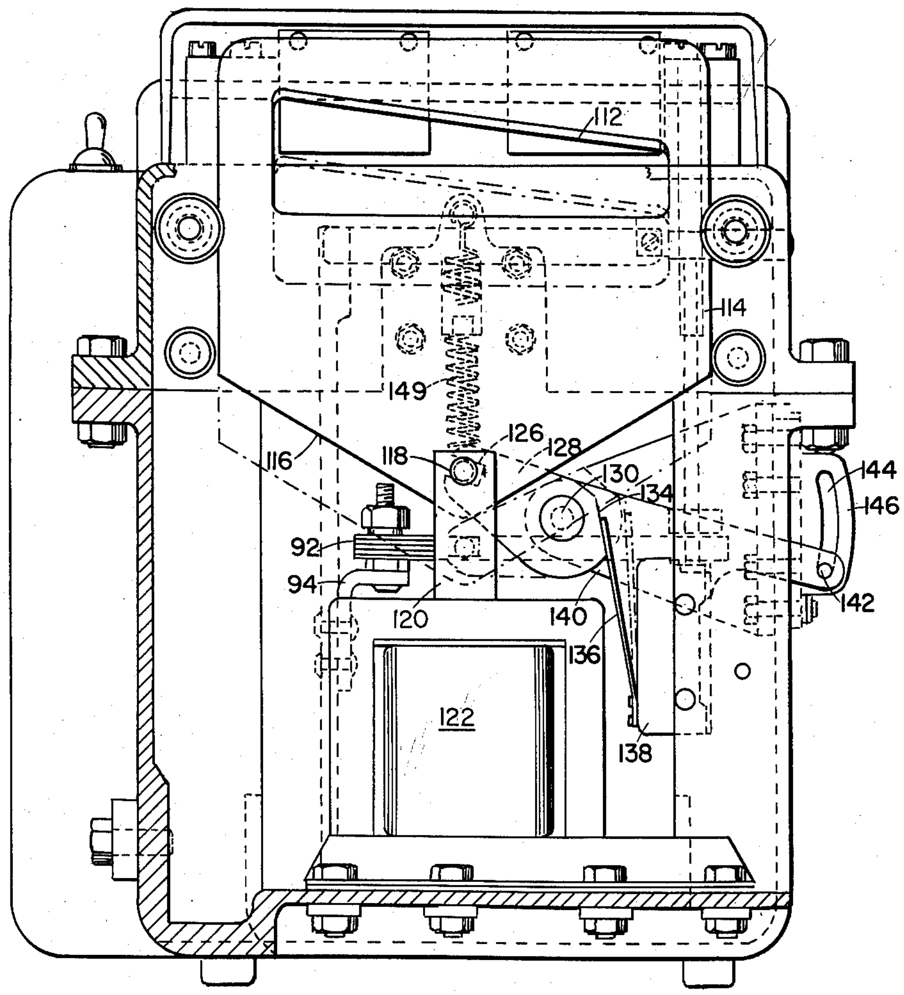
FIG. 6 is a vertical section on line 6—6 of FIG. 5.

The particular tape dispensing unit 3 chosen for illustration (FIGS. 1, 5 and 6) comprises a receptacle 63 in which is placed a roll of gummed tape 64, the receptacle being mounted on the casing 65 of the unit. As shown in FIG. 5, the tape strip 66 coming from the roll passes downwardly and forwardly between suitable guide plates 67 and 68, and between the feed rolls 70 and 72. The lower roll 70 is driven by a worm wheel 73 and worm 74 from a constant speed electric motor 75. The roll 72 is journaled on a shaft 81 in a yoke 82 which is pivoted on the pintle 83. When the yoke is swung downwardly, by means to be described, pressure will be applied by the roll 72 upon the tape thereby causing it to be gripped between such roll and the driven roll 70, thereby feeding the tape. When the pressure on the roll 72 is released, the feed of the tape will stop, even though the rolls continue to rotate. The means shown for drawing down the yoke and producing the gripping pressure between the rolls 70 and 72 comprises a solenoid 86 connected to the yoke through suitable linkage. As shown, the armature of the solenoid carries a pair of ears 88 which carries a cross pin 90. This pin is arranged to press down a multiple plate spring 92 when the solenoid is energized. This spring is mounted at one end on the bracket 84 on the frame of the machine, the free end of the spring engaging a head 96 adjustably mounted at the lower end of a pull rod 98, the upper end of which carries a head 100 bearing upon an arm 102 projecting from the yoke 82. The arm 102 is supported by a spring 104 which normally, that is, when the solenoid is de-energized, holds the yoke 82 in a raised position with the roll 72 out of gripping engagement with the tape and roll 70, so that tape is not being fed.

Cutting Means

The tape strip 66, after being fed forward by the feed rolls, passes between a pair of shear cutters, the lower one of which comprises a stationary plate or ledger blade 110. The upper member of the shear comprises a diagonal cutter 112 which is mounted on a cutter frame 114 which is shown as having a lower end in the form of a broad V 116. At the apex of the V is a pin 118, which is connected to arms 120 carried by the plunger of the cutter operating solenoid 122. The pin 118 has an extension 124 which is engaged by a notch 126 in the end of cam lever 128 pivoted on a stud 130 carried by a bracket on the frame of the machine. The cam lever 128 has a cam face 134 which is adapted to actuate the spring lever 136 of a microswitch 138. The microswitch 138 is mounted on a bracket plate 140, one end of which is pivoted on the stud 130. The other end of the plate 140 carries a clamping screw 142 which is slidable in a slot 144 in a plate 146 fixed to the outside of the casing. By changing the position of the screw 142 the plate 140 may be swung about the stud 130 so as to adjust the position of the microswitch with respect to the cam face 134. The microswitch is so related to the circuit of the cutter solenoid 122 that when the switch is actuated by the cam it will break such circuit. When the solenoid is de-energized, the cutter frame and blade 112 are held in upward position by a coiled spring 149.

By adjusting the position of the microswitch 138, the point in the travel of the cutter at which the switch will operate may be set. The cutter blade will be positively drawn down by the solenoid to this point which will be so determined as to insure the complete severance of the tape. This adjustment will be varied depending upon the type and thickness of the tape to be severed. After the microswitch has been actuated to open the circuit, the armature continues through the remainder of its travel by is own inertia before being returned by the spring. This arrangement insures that the tape will be completely cut off, while at the same time providing some easing of the shock on these parts by allowing the cutter to slow down towards the end of its travel. The circuit of the cutter solenoid is preferably provided with a regulating rheostat, as will be described in connection with the wiring diagram.

Tape Moistening Means

After passing the cutter, the tape strip 66 passes over a moistening brush (or plurality of brushes) 150 against which it is held by a weighted pressure plate 151. The moistening brushes 150 are mounted in a water tank 154 which may be kept supplied with water from an inverted reservoir 156.

From the foregoing it will be seen that the essential operating parts of the tape feeding unit comprise a driving motor 75, the feed rolls 70 and 72, the feed solenoid 86 and its connections by which the rolls are caused to grip or release the tape, the cutter shear actuated by the cutter solenoid 122, and the tape moistening brushes 150 and associated parts.

Electrical Tape Length Measuring System

The motor 75 is of the constant speed type, so that measurement of the tape depends upon the length of time that the feed rolls are held pressed together by the feed solenoid 86. An electrical system is used in which simultaneously with the initiation of feed by the closing of a circuit of the solenoid 86, electrical devices are prepared in such a way that after the passage of the necessary interval to permit the desired length of tape to be fed, the circuit through the solenoid 86 is broken, whereupon the feed will immediately cease, and thereafter the cutter solenoid is actuated to cut off the piece of tape. The measuring system illustrated utilizes a tube 217, FIG. 14, in the form of a three element miniature gas triode or thyratron preferably of the cold cathode type. Connected to this is a capacitor 218.

The capacitor is charged by the circuit including the number of the resistance 29 or 31, as the case may be, which have been introduced into the circuit by the pressure of the box upon the contact members of the series of microswitches, depending upon the dimensions of the box. Thus, the total resistance introduced into the circuit will depend upon the size of the box which, in turn, determines the length of time it will take the capacitor to build up a sufficient voltage. This voltage ionizes the gas and breaks down the resistance between the anode and cathode of the thyratron, so as to cause the latter to fire, and thereby stop the operation of the tape feeding and cause the cutter to actuate.

Each of the series of box-engaged contact members 19 and 21, respectively, is associated with its own key relay, as shown in the wiring diagram FIG. 14. One suitable mounting of key relay is shown in FIGS. 2 and 3. For ready accessibility it is convenient to mount these key relays in a special housing 170 mounted upon the shipping bench, as shown in FIG. 1. Mounted in the housing are the long length key relay 172, and short length key relay 174. Each relay preferably has associated with it a potentiometer type variable resistor 176 and 178, respectively, which are preferably arranged for a screw-driver or key adjustment, and which are included in the circuits with the switches 25 and 27 and resistances 29 and 31, respectively, so that the overall resistance of these circuits may be adjusted when necessary. The presence of these resistances insures that each of the resistance circuits shall have at all times a minimum resistance, irrespective of the number of contact switches opened by the pressure of the box. This insures that a minimum length of tape will be fed, and in particular provides for a constant length of tape to be fed in addition to that determined by the size of the box, such constant length being sufficient to provide the necessary overlaps where the ends of the pieces of tape are bent down over the ends of the box. If the amount of overlap required is to be changed, the resistances 176 and 178 are adjusted accordingly.

It is of course possible to furnish the additional increment of resistance for the tape overlap ends (in each measuring circuit) by adjusting the last potentiometer 29 and the nearest potentiometer 31 so that it measures not only its normal tape length but also the additional overlap increment. That obviates the need for additional potentiometers 176 and 178 in the relay housing 170. However, it is handier for the operator to change the length of the tape overlap ends if he does not have to open housing 9 to make such adjustment but merely turns an exposed screw in relay housing 170.

In the construction shown in FIGS. 2 and 3, each key relay comprises a fixed frame member 202 carrying a coil 204. Pivotally mounted on the frame 202 is a bell crank 207, one part of which carries an armature which is mounted in a position to be influenced by the pole piece of the coil 204. The key relays are shown as having key tops or buttons 196 secured to the armature carrying arm of bell crank 207. The other arms of the bell cranks 207 carry protuberances 210 adapted to engage the first pair of a series of contact blades 211 and actuate such blades so as to close the first and second pairs of contacts, the second closing pair of which is arranged in the circuit of the coil 204. The buttons 196 provide a convenient means for operating the mechanism for any purpose when a box is not in place.

A typical schematic wiring diagram is shown in FIG. 14. The leads 220 may be plugged into any ordinary A.-C. power circuit of proper voltage. These leads are connected to the main switch 182 from which wires 222 lead to the driving motor 75, while branch wires 224 leads to the feed solenoid 86 and cutter solenoid 122. Other wires 226 lead from the main switch to the primary winding 228 of a transformer which is preferably provided with two secondary windings 230 and 232. The low voltage secondary winding 230 merely provides current for the pilot light 184. The winding 232, which is a high voltage winding, provides rectified current for the control circuits through a suitable arrangement of resistors 234 and 236. The latter may be of any suitable type but selenium rectifiers are preferable. Filter condensers 238 and 240 are also provided as needed, and the rectified current is divided at the output of the last filter and condenser 240 into two portions, one folowing the conductor 242 to supply battery for the control relays, the other part of the current passing through conductor 244 to the measuring circuits through the voltage regulating tube 246.

The thyratron 217 is shown as having the usual cathode 250, anode 252 and control electrode 254. A protective resistor 256 in series with the control electrode limits the current flow through this element to a safe value. A calibrating resistor 258 is also provided in connection with the tube by which slight changes or adjustments in the overall timing values may be made to compensate for variables such as aging of various circuit elements and extremes of ambient temperature. This resistor should have an adjustment available only to the technician. By means of a conductor 260 a low value current is applied to the control element 254, as soon as the main switch of the apparatus is closed. The current flow from the control element to the cathode, amounting only to a few micro amperes, does not affect the main gap of the tube but causes a cloud of ions in the tube to be available whenever the machine is called on to measure tape, so that the thyratron is maintained at all times in a constant state of readiness.

*Protective Circuit*

In order to prevent false operation during a feeding cycle, and thereby prevent the feeding of a second piece of tape until the feed of a first piece of tape has been completed, a protective circuit and relay are provided to which the *a* contacts of the key relays are connected. If the condition of the circuit is such that the machine is ready for initiation of a feeding cycle, this is determined upon the closing of the *a* contact, whereupon the cycle continues. If the machine is not ready for operation, the closure of that contact will not permit the cycle to proceed.

The protective circuit includes relay 270 which is energized through a wire 272 and contact 274 with power from the rectified voltage wire 242. The contact 274 of a stop relay to be described is normally open when no tape feeding operation is taking place, but after the initiation of a feeding operation, it will be closed, as will be described below, and will remain closed until a particular feeding cycle is completed, whereupon it will open again. The protective relay is also provided with a locking circuit including a conductor 275 which is connected to the *a* contacts of the key relays, and also to a contact 276. The contact 276 is normally open, but if the relay has been energized due to the fact that the contact 274 has been closed, then, when the *a* contact is closed, the circuit will be established from the *a* contact through the conductor 275 and the contact 276, which will keep the relay 270 energized so long as the *a* contact is held closed, even though the contact 274 may, in the meantime, have opened.

The normal condition of the protective circuit when the apparatus is ready to receive the impulse necessary to deliver a piece of tape is shown in FIG. 14. Closing of an *a* contact will in this condition of the protective circuit be without effect as contacts 274 and 276 are open. The corresponding *b* contact will next be closed, which will close the circuit through the coil 204 of the key relay which receives power from the rectified voltage conductor 242 by way of the wire 280, and normally closed contact 282 of the protective relay to ground. The protective relay also has a contact 284 which is connected to the rectified voltage source 242 and is in effect the main source of power supply to the circuit initiating feed of tape to be described. This contact 284 is normally closed when the protective relay is not energized, as shown. The closing of the circuit through the coil 204 next closes the contact *c*, and this prepares a path from the regulated voltage source 244 and conductor 290 through the resistances 29 or 31, as the case may be, and through the conductor 294 leading to the thyratron.

*Feeding and Measuring Cycle*

The last movement of the key relay solenoid will close the *d* contact which, through a conductor 296, closes a circuit through the winding of a relay 298 which may be termed the "start" relay. The start relay operates a contact member 300 which, in its up position, closes a circuit from the A.-C. supply lead 224 through the winding of the feed solenoid 86, thereby initiating the feed. The start relay also opens the contacts 302 and 304, and closes the contacts 306 and 307. The closing of the contact 307 supplies regulated voltage from conductor 244 to the conductor 290, above described, and also initiates the application of voltage to the anode 252 of the thyratron through the conductor 308. The opening of the contact 304 cuts out the high resistance 309 which is limiting current flow to the control electrode 254. The opening of contact 302 opens the short circuit which has completely discharged the capacitor 218. Closing of contact 306 connects the capacitor 218 with the thyratron. The capacitor voltage now starts to build up, and after the interval of time determined by the value of the total of the resistances cut into the circuit by the contact switches engaged by the box, the main gap of the thyratron will break down and current will flow through the conductor 320 connected to the cathode 250. The conductor 320 is connected to the winding of a second relay 322 which may be termed the "stop" relay. This relay is arranged to close contacts 324, 274 in the protective circuit, and 326, and to open contact 327. Closing the contact 274 energizes the protective relay 270 and opens contacts 282 and 284. Opening of contact 282 breaks the circuit through the key relay 204, and breaking of the circuit through the *d* contact of the key relay releases the relay 298. This releases the contact member 300 which returns to its lower position and prepares the circuit, so far as this contact is concerned, through the cutter solenoid 122. Opening of the contact 327 breaks the circuit through the feed solenoid 66 and thereby stops the feed. At the same time, closing of the contact 324 completes the circuit through conductor 328 leading to the cutter solenoid 122. This circuit preferably includes an adjustable resistance 330 by which the action of the cutter solenoid may be regulated to suit the type of tape being cut, and to secure a smooth and easy cutting stroke.

The momentary discharge from the thyratron energizes the stop relay 322 and causes the latter to close the contact 326 and thereby establish a holding circuit through the conductor 340 and the normally closed microswitch 138 so that the stop relay and cutter relay remain energized until the cutting of the tape is completed, whereupon the microswitch is opened by the cam 128 actuated by the armature of the cutter solenoid 122 at some point in its travel as described above. Until this occurs the contact 274 is held closed so that the protective relay 270 is energized and the protective circuit is effective as above described. The opening of the microswitch by the cam 128 marks the end of the cycle, deenergizing the stop and protective relays and placing the circuits in condition for the next operation. Condensers 344 and 346 and resistors 348 and 350 may be provided as needed to limit the burning of the contacts of the stop relay.

It will be seen that the protective relay 270 becomes energized the instant that the stop relay 322 is actuated by the firing of the thyratron. Relay 270 will remain energized in any case until the opening of the microswitch by the cam at the completion of the cutting stroke. It will remain energized after the opening of the microswitch due to the closure of the locking contact 276, if any of the contact members are being pressed while the contact 274 is closed. Thus, the protective relay system prevents false operation of the machine due to closing of a contact before the previous feeding cycle has been completed.

It will be seen that in the type of machine described above, tape measuring is accomplished by feeding at a constant speed and varying the time of feeding by a timing circuit activated when the feed starts, and stopping the feed at a predetermined interval, depending upon the amount of resistance introduced as determined by the dimensions of the box. This system has the advantage that increments of tape fed may be chosen simply by fixing the space between successive contact elements and associating the proper unit resistance with each contact element. Thus, it is possible, for example, to have the increments smaller for the width of the box than for the length of the box by simply spacing the lateral contact elements closer together than the longitudinal contact elements. It is also possible to increase the amount of tape fed upon closing of the first contact element, so as to provide a minimum length which will always be fed. This will take care of the overlap for the ends of the box, and if a box is above minimum size never to be handled, then the first contact element can be placed at a distance from the stop within the limits of the smallest size box to be handled, and can be caused to cut into the circuit a resistance of sufficient value to insure that the minimum piece of tape delivered will be sufficient to seal a minimum size box with the necessary overlaps.

*Dispenser With Contact Roller Tape Measurement*

In FIGS. 15 to 24, the present invention is shown as embodied in a machine in which the length of tape, instead of being controlled by duration of feed, as in the previously described machine, is controlled by the number of rotations of a small measuring roller, which is also the contact roller pressing the tape against the motor driven feed roller. The tape is fed in unit lengths each equal to the circumference at the measuring roller, mechanism being provided to cause the feed to continue during one or more complete revolutions of the measuring roller. When the measuring roller has made the predetermined number of revolutions to deliver the selected length of tape, the feed is stopped and the cutter operated. One machine of this type is that disclosed in the patent to Hempel #2,767,981, October 23, 1956, and such a machine is illustrated herein with such changes made as to enable the machine to be controlled directly by the size of the box instead of push buttons or other manually controlled means.

FIGS. 15 and 16 show the box measuring frame 400, which is similar to the frame shown in FIGS. 7 to 10, except that it embodies no resistors corresponding to the resistors 29 and 31. Instead, the contact members 19 and 21, when pressed down by the box, merely close normally open microswitches 25 and 27 in certain circuits of the machine.

The construction of the dispenser illustrated in FIGS. 17 to 24, except for changes in certain circuits, is the same as that shown in Patent #2,767,981.

The machine includes a base plate 421 and interior parallel vertical walls 422 and 423. Between the walls is a receptacle 428 for a tape roll 429. Forwardly of the receptacle is a water reservoir 430 within which is a tape moistening brush 431.

An electric motor 440 is supported on the wall 422 upon a bracket 441. A suitable reduction gear unit 442 is driven from the motor.

A composite feed shaft 443 is rotatably supported by the walls 422 and 423, and one end of it is operatively connected with the reduction gear unit 442. A tape feed wheel 448 is secured to the shaft 443 between its ends and at its outer end 446, the shaft carries friction drive wheel 451.

A solenoid 455 mounted on the wall 423 includes a plunger member 457 to the upper end of which is pivotally connected a block 458. An inverted J member 459 threadedly engages the upper end of the block, and its hook end engages the free end of a pivotally mounted link 460. A tension spring 461 biases the link 460 counterclockwise. The link 460 is secured at its other end to one end of a rotatable shaft 465.

A yoke 470 is keyed to the rotatable shaft 465 and has legs extending downwardly and rearwardly therefrom carrying a shaft 471 on which is mounted a tape pressure wheel 475 having a serrated periphery. A cam 476 in the form of a disc having a peripheral projection 477 of non-conducting material is secured to the pressure wheel 475 for rotation therewith. Normally open resilient switch blades 478 and 479, each supporting a contact, are mounted on the base of the yoke member 470 through a laminated insulation block 480 and extend into position adjacent the periphery of the cam 476, and are adapted to be moved into closed circuit making position upon engagement of the switch blade 479 by the cam projection 477, which occurs once for each revolution of the pressure wheel 475. A second cam 476' provided with a peripheral projection 477' is also secured to the pressure wheel 475 and closes normally open resilient switch blades 478' and 479' once for each revolution of the pressure wheel. The projection 477' is spaced one hundred and eighty degrees from the projection 477.

A bell crank lever 485 is pivotally mounted beneath the forward portion of the link 460 upon a stub shaft 486. On the free end of the rear arm of the bell crank lever are mounted, for pivotal movement on a nut and bolt assembly 487, a roller 488 having a knurled periphery and a cam 489. For stopping the roller 488 in a selected position, there is provided a spring loaded ball detent unit 490 which is mounted in the rear arm of the bell crank lever 485 for engagement of the spring loaded ball thereof with an indentation in the surface of the roller, 488. The roller 488 is mounted off center on the nut and bolt assembly 487 and is cut away at one side. The cam 489 includes a shouldered notch 491 which is engageable by the hook end of a pawl 492 pivotally connected by a screw 493 to the link 460. A tension spring 494, secured to the link 460 and to the pawl 492 biases the pawl into engagement with the periphery of the cam 489. The forward end of the bell crank lever 485 pivotally receives in a suitable aperture the free end of an extension member 496 which is secured to the free end of a tape severing pivotally mounted knife blade 297 which cooperates with a fixed blade 499. A tension spring 500 biases the blade 497 into open position.

Referring to FIG. 24, there is shown diagrammatically the above-mentioned electrical control system. This includes a stepping switch 530, a series of double throw three-pole relays 510, 511 and 512, etc., which are connected alternatively to the box measuring switches 25 and 27, a three-pole single throw relay 532, a double throw single-pole ratchet relay 502, a tape cut-off knife control switch 503, the feed solenoid 455, the motor 440, the switch blades 478, 479 and 478′, 479′, the box measuring switches, the switch of the continuous operation button 522, resistances 534 and 535, and the necessary leads which interconnect the several elements and tap the power line. Also included are the starting switch 43 tripped by the box when pushed against the stop, which starts the "long" strip feed, and the finger trigger switch 57, which is pressed to feed each "short" strip. As noted, the switch 57 is a double-pole switch which, when tripped, disconnects the long strip switches 25, so that they cannot interfere with the short strip switches 27 and vice versa.

The stepping switch 530 includes a stepping relay 595 and a reverse stepping relay 596 of standard construction, which includes coils 597 and 598, respectively. Two spaced coaxially mounted discs 600 and 601 are provided, the former having peripheral contacts 510*a*, 511*a*, 512*a*, etc., and the latter having peripheral contacts 510*b*, 511*b*, 512*b*, etc., each to the number of corresponding box measuring switches employed with the particular machine. Additionally, each of the discs 600 and 601 has a single index or home contact, that for the disc 600 being designated 602 and that for the disc 601 being designated 603. A wiper arm 604 is secured to a shaft extending through the center of the disc 600 and is disposed for engagement with the contacts 510*a*, 511*a*, 512*a*, etc., and the index position 602. The wiper arm 604 is suitably mounted on a contact post 605 to which is connected the lead 541. A wiper arm 606 is secured to the same shaft to which the wiper arm 604 is secured, the shaft extending through the disc 601. The wiper arm 606 is mounted on a contact post 607 to which the lead 584 is connected. The wiper arms 604 and 606 are secured to the shaft in parallel relation so that they engage the respective index positions 602 and 603, respectively, at the same time. The forward and reverse stepping relays 595 and 596 are mechanically connected to the shaft mounting the wiper arms 604 and 606 by the usual pawl and linkage construction as is indicated by the respective broken lines 610 and 611. The relay 595 is adapted to step the wiper arms 604 and 606 simultaneously in a clockwise direction, and the relay 596 effects a similar movement of both arms in a counterclockwise direction. A switch 612, provided in the circuit through the coil 597, is normally closed, but is mechanically opened each time the coil 597 is energized in the stepping action.

The electrical connections for the stepping switch 530 are clearly indicated in FIG. 24. It may be seen that the leads 541 and 584 are connected respectively to the resistances 535 and 534 each of which is in turn connected to a lead 540 and thence to line. The contacts 510*a*, 511*a*, 512*a*, etc. are individually connected by respective leads 550*a*, 551*a*, 552*a*, etc. to separate contacts 624 of respective double throw three-pole relays 510, 511, 512, etc. more particularly referred to below. The contacts 510*b*, 511*b*, 512*b*, etc. are all interconnected by a lead 554 and thence into a lead 555. The contact 602 is connected by a lead 556 to one side of each of the switches 510, 511, 512, etc. The contact 603 is connected by a lead 557 to a contact of the three-pole single throw relay 532. The coils 597 and 598 of the stepping relays 595 and 596 are connected by a lead 558 to the lead 540. The other side of the coil 597 is connected by a lead 560 to one side of the switch 612, the other side of the switch 612 being connected by a lead 549 into each of contacts 623 in the several double throw three-pole relays 510, 511, 512, etc. The other side of the coil 598 is connected by a lead 562 to a movable switch arm 563 of the ratchet relay 502.

Each double throw three-pole relay 510, 511, 512, etc. includes a coil 615 and a switch having an upper stationary contact 618, movable or throw contacts 619, 620 and 621, and lower stationary contacts 622, 623 and 624. It will be observed that, in addition to the aforementioned connections of the contacts 623 and 624, the several contacts 622 are interconnected by a lead 564 which is in turn connected to the resistance 535. Also, the several throw contacts 620 are interconnected by a lead 565 which connects with a lead 566 and thence to line. It will be particularly noted that any one of the contacts 621 is connected by a lead 567 to the feed solenoid and thence to line whereas each other contact 621 is separately connected by individual leads 568 to a contact 618 of a different relay 510, 511, 512, etc. The remaining contact 618, which may be any except the one which is directly associated with the aforementioned one contact 521 connected to the lead 567, is connected to a lead 569 to the coil of switch 532. Each of the contacts 619 is separately connected by individual leads 571 to a respective pair of box measuring switches, 25, 27 and a separate coil 615 is connected into each of the several leads 571. The other side of each of the coils 615 is connected to the lead 570 which is in turn connected to the lead 566.

The three-pole single throw relay 532 includes a coil 630 and a switch having movable or throw contacts 631, 632 and 633, and stationary contacts 634, 635 and 636. The several contacts 631 through 636 are insulated from each other and are connected as shown. Thus, in addition to the aforementioned connection of the contact 632 through the lead 557 to home contact 613 of disc 601, it will be noted that the contact 631 is connected by a lead 572 to the resistance 634 and through lead 584 to the contact post 607. Additionally, the contact 633 is connected by a lead 561 to the feed motor 440. The contact 634 is connected to a lead 573 which joins the aforementioned lead 555 and is thereafter connected into one side of the coil 630, the other side of the coil 630 being connected by a lead 574 to the aforementioned lead 569. The contacts 634 and 636 are interconnected by a lead 575, the latter being connected by a lead 576 to the lead 569.

The double throw single-pole ratchet relay 502 is of standard construction and includes a coil 505, one side of which is connected by this lead 509 and 555 to the stepping switch 530, and the other side of which is connected by a lead 606 into the lead 565 and to the line. Two stationary contacts 507 and 508 and a movable contact blade 563 are provided. The contact 507 is connected by a lead 507*a* to the switch blade 479 and the other contact 508 is connected by a lead 508*a* to the switch blade 479. A lead 449 connects the contact 478′ to the lead 557, and a lead 448 connects the contact 478 to the lead 449. As mentioned above, the lead 562 is connected to the movable blade 563 of ratchet relay 502. The ratchet relay 502 changes polarity each cycle of relay operation to throw the blade 563 back and forth between the contacts 507 and 508, thereby determining which pair of the switch blades 478, 479 and 478′, 479′ is effective for the particular cycle.

A tape cut-off knife control switch 503 is automatically actuated by the knife linkage at the start of the cut-off action and includes a pair of contacts 577 and a bridge 578, the bridge normally being out of bridging engagement with the contacts. A lead 579 connects one contact 577 with the lead 569 and the other contact is connected by a lead 580 to the lead 561′ which is connected to one side of the motor 440.

The feed solenoid 455 has one side connected to the lead 567, and the other side connected by a lead 582 to the leads 555 and 573. The side of the motor 440 opposite the aforementioned connection is connected by a lead to the lead 540.

The operation of the dispenser above described is as follows:

When the box is placed upon the frame it will close a number of the switches 25 and 27 depending upon its dimensions. The number of switches closed will determine the number of 3-pole, double-throw relays 510, etc., which are activated. Upon closing of the starting switch 43 by pressure of the box thereagainst, the apparatus will be set in operation. The contacts 510*a*, etc. will be activated or armed, depending upon the number of switches in the series closed by the box, which in effect measure the length of the box. The longer the box the higher the number of the contacts in the stepping relay activated.

Simultaneously, the tape measuring roll will be pressed against the tape and held in contact with the moving tape feed wheel and the length of tape being fed will be measured by the number of rotations made by the tape measuring roll. Each time the cam projection on one of the cams attached to the roll rotates it will close a pair of the associated contacts and thereby move the arms of the stepping relay one step. This will continue until the arms have reached the last contact, which has been armed or activated as determined by the number of box contact switches which have been closed. When the arms of the stepping relay reach this contact, feed will stop and the tape will be severed. A measured length of tape fitted to the size of the box will thus be automatically dispensed. For dispensing the short lengths for the width of the box, the switch 57 is manually closed which will cause a measured length of tape to be dispensed, the length of which is determined by the number of switches 27 in the transverse series of switches which are closed.

Provision is made for adding the necessary overlap increments which are turned down over the ends of the box irrespective of the length of the box. This may be accomplished in a machine of the type under discussion by connecting the last tripped box switch 25 (FIG. 15) to those relays in the dispenser which will result in the feeding of the desired additional length for the overlap. For instance, assuming that the shortest box to be sealed with 3″ overlap ends is 10″, then the shortest strip wanted from the machine will be 10+3+3=16″ long. In a machine of the type described in which 4″ of tape is fed with each revolution of the feed wheel 475. This can be accomplished by connecting the last box switch 25 to all of the first four relays, 510, 511, 512, etc.

*Dispenser With Tape Lengths Controlled by Movement of a Measuring Element Through a Limited Arc*

In FIGS. 25 to 29, an example of the application of the present invention to a different type of tape dispenser is illustrated. In accordance with this embodiment of the invention, the box contact elements which may be the same as illustrated in FIGS. 15 and 16 are combined with a machine in which the measurement of the tape is accomplished by rotation of a tape contact roll which drives through reduction gearing a measuring disc or sector for a limited distance less than one complete revolution of the discs, the stopping of the movement of the disc stopping the feed in accordance with the presetting of a stop device. A machine of this character is disclosed in patent to Lasko, 2,776,833, January 8, 1957.

Referring to the schematic wiring diagram of this machine, FIG. 29, it will be seen that the series of "long" strip switches 25 and "short" strip switches 27 will both be connected to a series of length determining solenoids 800 which are arranged in an arc, so that their plungers 801 will intercept a trip switch 802 carried on an arm 804 which rotates in accordance with the length of strip fed as will be described. The plungers of these solenoids are normally pushed out by spring pressure to positions to be engaged by the trip switch, but when the solenoids are energized their plungers will be retracted out of the path of such switch. When the switch engages a solenoid plunger which has not been retracted, the feed will stop. The length of feed therefore depends upon the distance which the switch 802 travels before it engages a solenoid plunger. The number of plungers retracted will depend upon the number of switches pressed down by the box. The box when pushed against the top roller 23 will actuate the switch 43 so as to start the operation of feeding of a "long" strip. For feeding of the "short" strips, a manual switch 57 is provided which when operated cuts out all of the "long" strip switches 25 and cuts into the circuit the "short" strip switches 27 so that a "short" strip of a length determined by the width of the box will be delivered. A second actuation of the switch 57 will deliver another "short" length of strip, a trip lever 61 (FIG. 6) conveniently located is provided for tripping the switch 57.

Means are preferably provided for assuring that the minimum length of strip feed will be long enough to include the necessary overlaps. This may be accomplished by merely locating the whole bank of stop solenoids sufficiently far along the path of the movement of the trip switch so that the necessary overlap increment will always be added before the switch contacts the first plunger.

Switch 802 is a two-position switch and is actuated by two buttons 806 and 808. When the button 806 is pressed the switch closes the circuit through the motor and solenoid 738 which operates the feed rolls and cutter, as will be described below. When the arm 804 and switch 802 are moved in a clockwise direction the button 808 contacts the plunger of the last solenoid which has not been energized by the closing of the box contact switches and thereby moves the switch 802 to open position and stops the feed, whereupon the arm 804 moves back to its initial position carrying the switch 802 with it. For starting the next tape feeding operation the button 806 has to be pressed and this is done by means of a trip solenoid 810, which moves a trip lever 812 into contact with the button 806. The circuit through the solenoid 810 is closed through the box contact switches and the box trip switch 43 or manual trip switch 57, as the case may be.

The dispenser shown in FIGS. 25 to 29 comprises a frame or housing including laterally spaced side frames 701 and 702. An electric motor 705 is located at one side of the machine, and control mechanism at the other side. The rear portion of the machine housing provides between the side frames, a well for a supply of the tape. The tape from the roll is adapted to pass forwardly over a guide roll 708, and thence forwardly along a guide plate or channel 709 to and past the cutter element 770, and along a feed guide means or throat 709*a* so as to pass in moisture-receiving relation across a capillary moistener 780.

The tape is advanced by a pair of feed rolls 711, 712, one of which is power driven and the other of which is bodily movable to and from feeding relation with the tape passing between the rolls. The power-driven roll 711 is fixed at the inner end of a transverse shaft 713 extending about half-way across between the side frames and extending out through the side frame 701. The outer end of the shaft 713 carries a worm wheel 715 meshing with a worm 716 fast on the longitudinal shaft of the motor 705. In preference to starting and stopping the motor for each feed cycle, provision is herein made for starting and stopping the feed through the bodily relative movement of the feed rolls 711, 712 to and from a mutual feeding relation. The upper or measuring roll 712 is fixed at the inner end of a transverse cross shaft 720 journalled in a sleeve 721 which is carried at the forward end of the upper arm 723 of a bell crank of which the other arm 724 extends downwardly and laterally, terminating in a forked portion **724*a* which straddles the actuator rod 745 to be referred to. The roll-carrying bell crank 723, 723 is supported for rocking movement about the axis of a cross shaft 726.**

Selective and automatic length control is had by measuring action in which the upper feed roll 712 is utilized as the measuring element. For translating this length-measuring rotation of the feed roll into a proportionate movement of a feed-stopping length-control element, the shaft 720 has fixed at its outer end a pinion 727 meshing with a gear 728 mounted on the cross shaft 726. Said gear has concentrically fixed with it a smaller pinion 729 meshing with a large gear 730 rotatable on a stud 731.

The gear 730 together with parts associated with and moving with it constitutes a length control element having a reduced angular movement directly proportional to the length of tape fed between the active feed rolls 711 and 712. The described gear train between the upper or measuring feed roll 712 and this length control element or gear 730 effects a substantial reduction, this being such that the maximum available predeterminedly-measured feed length for the given machine, is proportionately expressed by not more than one full 360° rotation of the gear 730. The establishment of a feed status for the feed roll pair 711, 712, and subsequent interruption thereof, is had by bodily movement of the upper or measuring roll 712 of the pair, by rocking of the roll-carrying bell crank about its pivotal axis. This action is accomplished by means of the actuator rod 745 previously mentioned. This actuator rod 745 is bodily movable lengthwise in one direction, herein rearwardly or toward the right in FIG. 27 at the beginning of a cycle and reversely in terminating the cycle. For so operating it there is employed a solenoid 738. The actuator rod 745 is coupled at its rear end to the solenoid armature 740, and at its front end is connected to the cutter bell crank 750. A coil spring 748 surrounding the actuator rod moves the actuator rod in the stopping or non-feeding direction upon de-energizing of the solenoid 738 to end an operating cycle. The actuating connections for the tape severing means are also associated with the actuator rod 745. Such cutter connections comprise the cutter bell crank element 750. The vertical arm is pivotally connected at the upper end to the front end of the actuator rod 745. The other arm of the cutter bell crank 750 is pivoted at its front end to the lower end of a vertical cutter link 758 which actuates the cutter 770.

The means for controlling the delivery of the correct length of tape as determined by the measurements of the box are driven from the gear 730. This gear carries at the outer face a friction drive plate 790 having a peripheral flange 791. Free on the same stud 731 with the gear 730 and drive plate 790 is a trip switch carrier 793 in constantly engaged yieldable friction driving relation to the plate 790 through friction shoes 798 so as normally to turn with the plate through its less than 360° rotation per cycle. This member 793 which constitutes a moving part of the rotary feed-length control element has a central disc portion at the outer face of which a lateral annular flange 794, defining a housing drum for a convolute spring 795 of the clock type which will return the machine to zero position. The drum-like element 793 carries a radial projection or arm 804 to which is fixed a spring 805 on which is mounted the micro-switch 802.

Through the described continuously engaged frictional drive connections the member 793 affixed to the outer end of the clock spring 795 will under all normal operations be driven as a unit with the gear 730. During the active feed of tape this unit is rotated in a direction to tension wind the spring 795. When the tape to the desired length has been fed in any given operating cycle, automatic de-energizing of solenoid 738 and resultant separation of the feed rolls 711, 712 releases this rotary length measuring mechanism including the member 793 for return to a zero starting position.

*Manual Dispenser With Automatic Strip Length Control*

Some of the principals of the present invention may also be advantageously employed in connection with tape dispensing machines which are not motor driven. In many such machines, provision is made for determining the length of tape fed at each operation of the hand lever or other operating members by means of an adjustable stop, which is set so as to stop the lever when a desired length of tape has been delivered.

FIGS. 30 and 31 show a hand lever operated machine which is provided with a plurality of solenoid operated stops which are controlled by means of switches in the table on which the box is set so that the size of the box determines the number of solenoids which are activated. Ordinarily, the solenoid plungers or stops operated by the solenoids are all projected into the path of the operating lever so that upon operation of the lever it will only be possible to deliver the minimum length of tape. This minimum length normally will include a length sufficient to provide the overlaps of the ends of the box plus a length corresponding to the smallest size box which the machine is intended to handle. Upon placing the box upon the contact equipped table, a number of switches are closed depending upon the size of the box and these switches in turn retract a number of the operating lever stops. The bigger the box the more stops are retracted and, accordingly, the further the lever may be moved. This, in turn, will cause a longer strip of tape to be delivered so that the length of strip is proportioned to the sizes of the box.

FIG. 30 shows the dispenser casing 900 in which is a roll of tape and the usual dispensing rolls (not shown) which are operated by the hand lever 902. This is pulled forward until it contacts one of the stops or plungers 904 of the solenoids 906. When the box is placed on a table or frame which may be like that shown in FIGS. 15 and 16, a number of the switches 25 will be closed. This will retract the plungers of the solenoids associated with the closed switches thereby permitting the lever 902 to be brought forward until it contacts the plunger of a solenoid not activated by the closure of its switch which is beyond the end of the box and, therefore, not closed by the pressure thereof. Thus the proper length of tape for such a box will be measured.

For measuring the width of the box, another set of switches 27 is provided, these extending transversely of the box measuring frame. When these switches are to be used to measure the width of the box, the switch **57*a* is moved over to throw the switches 25 out of circuit and include the switches 27** in the circuit.

I have described what I believe to be the best embodiments of my invention. I do not wish, however, to be confined to the embodiments shown but what I desire to cover by Letters Patent is set forth in the appended claims.

1. A tape dispensing apparatus comprising means for dispensing tape, control means for determining the lengths of tape to be dispensed, a support upon which an article may be rested, and a plurality of spaced sensing elements located at predetermined positions on said support and actuable in accordance with the dimensions of an article placed on the support while the article is in stationary postion thereon, and connecting means between said sensing elements and the control means, said sensing elements and connecting meas being operative to actuate said control means to determine a length of tape to be fed corresponding to the sensing elements actuated when an article is placed on said support.

2. An apparatus as claimed in claim 1, in which said sensing elements are contact elements associated with electrical switches, the condition of which is changed when the article is placed in contact with the contact elements.

3. A construction as claimed in claim 1, in which the sensing elements are arranged in two series, one extending longitudinally of the support and one extending transversely thereto, engagement of the article with the longitudinal series of sensing elements measuring the length of the article, and engagement of the article with the transverse series of sensing elements measuring the width of the article.

4. A tape dispensing means as claimed in claim 1 in which the dispensing instrumentalities comprise a lever movable through an arc and operatively connected with said instrumentalities for actuating the same to cause the feed of tape, a plurality of stops located along the arc of movement of said lever, solenoids for actuating said stops, switches in the circuits of said solenoids, a support for an article to be sealed, and a plurality of spaced contacts mounted on said support for engagement with an article placed thereon, said contacts being operatively connected respectively to said switches.

5. A construction as claimed in claim 4, in which the the contacts and switches are arranged in two series extending in different directions across said support and means for connecting one or the other of said series of contacts and switches alternatively with the stop operating solenoids.

6. In a dispenser for sealing tape, power operated tape dispensing means, electrical means for controlling the length of tape to be dispensed upon each operation of said dispensing means, a support for an article to be sealed, a series of contact members located at predetermined spaced positions relative to said support, some or all of which are adapted to be depressed by the article when placed on the support, the exact number depressed at any one time depending upon a dimension of the article, and a starting switch on the support adapted to be engaged by the article for starting the dispensing operation.

7. In a dispenser for sealing tape having power operated dispensing means, electrical control devices for controling the length of tape to be dispensed, a support including a series of conveyor rollers for supporting an article to be sealed, a series of switches connected to said control devices, spaced on said support, at predetermined intervals and having contact members adapted to be engaged by an article placed on said conveyor rollers, the number of said contact members engaged at any one time depending on the size of the article, and a trip switch associated with said support for engagement by an article placed on said conveyor rollers for starting a dispensing operation when engaged by said article.

8. In a tape dispensing machine having power operating dispensing instrumentalities operating at a uniform rate of feed and electrical control means for controlling the duration of feed and thereby of the strip length dispensed, the combination of a support for an article to be sealed, sensing elements spaced on said support at predetermined intervals for engagement by an article placed thereon, and operative connections between said sensing elements and said electrical control means for determining the duration of feed in accordance with the number of sensing elements engaged at one time by the article placed on said support.

9. In a dispenser for sealing tape, power-actuated tape dispensing means, electrical means for starting and for stopping the feed of tape by said power-actuated tape dispensing means, a support for the article for the sealing of which tape is to be dispensed, a series of sensing elements mounted on said support in predetermined spaced positions, one or more of which will be actuated by the article while the article is in stationary position on the support, the number of sensing elements actuated depending upon a dimension of the article, electrical switch means controlled by said sensing elements, and electrical connections between said electrical switch means and the electrical means for controlling the length of the tape fed by the tape dispensing means, whereby the length of tape dispensed is determined by the number of sensing elements actuated by the article placed on the support.

10. An apparatus as claimed in claim 9, in which the sensing elements are arranged in two series, and means for connecting either of said series with the electrical tape length control means so as to control the delivery of lengths of tape of different lengths proportioned to different dimensions of the article to be sealed.

11. A tape dispensing machine as claimed in claim 9 having power operating dispensing instrumentalities including a movable measuring element engaging the tape, electrical means controlling the movement of said measuring element for determining the length of tape fed, a support for an article to be sealed, contact elements located at spaced intervals on said support adapted to be engaged by an article placed thereon and connections between said contact elements and said length control means for controlling the length of tape dispensed in accordance with the number of contact elements engaged by the article at any one time.

12. A tape dispensing machine as claimed in claim 9 having power operating dispensing instrumentalities, a measuring element for measuring the length of the tape dispensed, a movable sector operatively connected to said tape measuring element and movable through less than 360° of rotation for measurement of the maximum length of tape which the machine is designed to deliver, means for stopping the movement of said sector at various points so as to limit the length of tape fed, said sector stopping means including a plurality of solenoids having movable stops associated therewith located along the path of movement of said sector, a support for the article to be sealed, a plurality of switches and contact elements located on said support for engagement by an article placed thereon, and connections between respective switches and solenoids.

13. A tape dispenser as claimed in claim 9, in which the tape feed cycle is started by a switch contacted by the article to be taped, and a timing device out of contact with the article to be taped stops the feed of tape.

14. A dispenser for sealing tape as claimed in claim 9 in which the support for the article is a conveyor table.

15. A dispenser for sealing tape as claimed in claim 9 in which the electrical means for starting and stopping the feed of tape comprise electronic control means including a control circuit and a plurality of resistances for inclusion in said circuit, the total of the resistances included at any one time determining the length of tape dispensed.

References Cited in the file of this patent

UNITED STATES PATENTS

| | | |
|---|---|---|
| 1,539,698 | Roettger | May 26, 1925 |
| 2,260,332 | Petskeyes | Oct. 28, 1941 |
| 2,708,368 | Kolisch | May 17, 1955 |
| 2,727,570 | Hempel | Dec. 20, 1955 |
| 2,767,981 | Hempel | Oct. 23, 1956 |
| 2,776,833 | Lakso | Jan. 8, 1957 |
| 2,860,462 | Sykes | Nov. 18, 1958 |
| 2,892,500 | Le Baron et al. | June 30, 1959 |